United States Patent
Mikuriya et al.

(10) Patent No.: US 10,467,620 B2
(45) Date of Patent: Nov. 5, 2019

(54) INFORMATION PROCESSING DEVICE, METHOD, AND STORAGE MEDIUM

(71) Applicant: Rakuten, Inc., Tokyo (JP)

(72) Inventors: Jun Mikuriya, Tokyo (JP); Jing Chen, Tokyo (JP); Nagaaki Hoshi, Tokyo (JP); Jumpei Haraguchi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 308 days.

(21) Appl. No.: 15/500,949

(22) PCT Filed: Aug. 4, 2014

(86) PCT No.: PCT/JP2014/070484
§ 371 (c)(1),
(2) Date: Feb. 1, 2017

(87) PCT Pub. No.: WO2016/020971
PCT Pub. Date: Feb. 11, 2016

(65) Prior Publication Data
US 2017/0221046 A1    Aug. 3, 2017

(51) Int. Cl.
*G06Q 30/00*  (2012.01)
*G06Q 20/34*  (2012.01)
(Continued)

(52) U.S. Cl.
CPC .......... *G06Q 20/351* (2013.01); *G06Q 20/28* (2013.01); *G06Q 20/342* (2013.01); *G06Q 20/36* (2013.01);
(Continued)

(58) Field of Classification Search
CPC . G06Q 30/0601–0645; G06Q 30/0635; G06Q 30/0637; G06Q 20/351; G06Q 20/342; G06Q 20/36; G06Q 20/28; G07F 7/0866

USPC ............... 705/26.1–27.2, 26.8, 26.82
See application file for complete search history.

(56) References Cited

U.S. PATENT DOCUMENTS 9,135,612 B1 * 9/2015 Proctor, Jr. .......... G06Q 20/202
2006/0064378 A1 * 3/2006 Clementz .............. G06Q 20/04
705/40
(Continued)

FOREIGN PATENT DOCUMENTS

JP       2000-231658 A    8/2000
JP       2001-229276 A    8/2001
(Continued)

OTHER PUBLICATIONS

Steele, Jason. 3 Parent-Friendly Debit Cards for Kids. Credit.com. May 16, 2014. (Year: 2014).*
(Continued)

*Primary Examiner* — Jeffrey A. Smith
*Assistant Examiner* — Allison G Wood
(74) *Attorney, Agent, or Firm* — Sughrue Mion, PLLC

(57) ABSTRACT

The following processes are performed: a control process for issuing a VP card such that information on a card number is associated with information on at least a user ID, a value, and an expiration date, a control process for, regarding a VP card specified as a gift target by the first user, newly associating between the VP card and a user ID of the second user other than the first user, a process of setting a return condition regarding the VP card specified as a gift target, a control process for displaying information on usage status of the given VP card to the second user on condition that login with a user ID of the first user is completed, and a process of performing a control for at least invalidating the association between the virtual prepaid card and the user ID of the second user.

13 Claims, 20 Drawing Sheets

(51) Int. Cl.
*G06Q 30/06* (2012.01)
*G06Q 20/28* (2012.01)
*G06Q 20/36* (2012.01)
*G07F 7/08* (2006.01)

(52) U.S. Cl.
CPC ..... *G06Q 30/0601* (2013.01); *G06Q 30/0635* (2013.01); *G06Q 30/0637* (2013.01); *G07F 7/0866* (2013.01)

(56) References Cited

U.S. PATENT DOCUMENTS

| 2012/0150605 | A1* | 6/2012 | Isaacson | G06Q 20/10 705/14.25 |
| 2013/0018792 | A1* | 1/2013 | Casey | G06Q 40/02 705/44 |
| 2013/0085938 | A1* | 4/2013 | Stone | G06Q 40/02 705/41 |

FOREIGN PATENT DOCUMENTS

| JP | 2002-056207 A | 2/2002 |
| JP | 2002-063517 A | 2/2002 |
| JP | 2003-069753 A | 3/2003 |
| JP | 2006-163466 A | 6/2006 |

OTHER PUBLICATIONS

International Search Report for PCT/JP2014/070484 dated Sep. 2, 2014.

* cited by examiner

Fig. 2

| USER ID | PASSWORD | NAME | RESIDENTIAL ADDRESS | EMAIL ADDRESS | C CARD INFORMATION | |
|---|---|---|---|---|---|---|
| U0001 | ○△×○ | ××△○ | 000-0000 ... | ×××@ ○×□.ne.jP | CARD NUMBER | C0001 |
| | | | | | CARDHOLDER | ××△○ |
| | | | | | EXPIRATION DATE | 201804 |
| ⋮ | ⋮ | ⋮ | ⋮ | ⋮ | ⋮ | |
| U××× | □△×× | □×○△ | 000-0000 ... | △××@ ○○△.com | CARD NUMBER | C×××× |
| | | | | | CARDHOLDER | △××○ |
| | | | | | EXPIRATION DATE | 202005 |

Fig. 3

| USER ID | CARD NUMBER | CARDHOLDER | SECURITY CODE | LINE OF CREDIT | AVAILABLE CREDIT | EXPIRATION DATE |
|---|---|---|---|---|---|---|
| U0001 | C0001 | ××△○ | 111 | 500,000 | 350,000 | 201804 |
| ⋮ | ⋮ | ⋮ | ⋮ | ⋮ | ⋮ | ⋮ |
| U××× | C××× | △×××○ | ××× | 500,000 | 200,000 | 202005 |

Fig.8

| CARD NUMBER | CARDHOLDER | SECURITY CODE | CARD NAME | VALUE | PURCHASE DATE | EXPIRATION DATE | BALANCE | PURCHASER USER ID | RECIPIENT USER ID |
|---|---|---|---|---|---|---|---|---|---|
| V0001 | ××△○ | △×× | FOR GRAMES | 10,000 | 20131205 | 201412 | 6,000 | U0001 | U0001 |
| ... | ... | ... | ... | ... | ... | ... | ... | ... | ... |
| V×××× | △××××○ | ××× | FOR NECESSITIES | 5,000 | 20140515 | 201505 | 5,000 | U×××□ | |

Fig. 9

| PURCHASED CARD LIST [VIRTUAL PREPAID CARD] ||||||
|---|---|---|---|---|---|
| CARD NAME | EXPIRATION DATE | PURCHASE DATE | VALUE | | |
| FOR GAMES | 2015/06 | 2014/6/15 | ¥1,000 | DETAIL | GIVE GIFT |
| FOR BOOKS & CDS | 2015/07 | 2014/7/4 | ¥5,000 | DETAIL | GIVE GIFT |

Fig. 12

| CARD NUMBER | RETURN EXECUTION BALANCE | PERIOD OF USAGE |
|---|---|---|
| V O O O 1 | | 201406 |
| ⋮ | ⋮ | ⋮ |
| V X X X | 500 | |

Fig. 13

PURCHASED CARD LIST [VIRTUAL PREPAID CARD]

| CARD NAME | EXPIRATION DATE | PURCHACE DATE | VALUE | | |
|---|---|---|---|---|---|
| FOR GAMES | 2015/06 | 2014/6/15 | ¥1,000 | DETAIL | GIVE GIFT |
| FOR BOOKS & CDS | 2015/07 | 2014/7/4 | ¥5,000 | DETAIL | GIVE GIFT |

GIFT-GIVEN CARD

| RECIPIENT NAME | CARD NAME | EXPIRATION DATE | PURCHASE DATE | VALUE | | |
|---|---|---|---|---|---|---|
| X○△△ | FOR GAMES | 2015/08 | 2014/8/10 | ¥10,000 | DETAIL | RETURN |

Fig. 14

| RECIPIENT NAME | CARD NAME | EXPIRATION DATE | VALUE | BALANCE | RETURN EXECUTION BALANCE | PERIOD OF USAGE |
|---|---|---|---|---|---|---|
| ×○△△ | FOR GAMES | 2015/08 | ¥10,000 | ¥10,000 | | 2015/02 |

USAGE HISTORY

| TRANSACTION SHOP | TRANSACTION DATE | TRANSACTION AMOUNT |
|---|---|---|
| | | |

| CARD NUMBER | RECIPIENT USER ID | RESTRICTED SHOP |
|---|---|---|
| V0001 | U0002 | SHOP A |
| ... | ... | ... |
| VXXX | UXXX | SHOP X |

INFORMATION PROCESSING DEVICE, METHOD, AND STORAGE MEDIUM

CROSS REFERENCE TO RELATED APPLICATIONS

This application is a National Stage of International Application No. PCT/JP2014/070484 filed Aug. 4, 2014, the contents of all of which are incorporated herein by reference in their entirety.

TECHNICAL FIELD

The present invention relates to an information processing device and method, a program for executing the information processing device, and a storage medium storing the program. In particular, the present invention relates to a technical field of a gift function of a virtual prepaid card.

CITATION LIST

Patent Literature

Patent Document 1: Japanese Unexamined Patent Application Publication No. 2006-163466
Patent Document 2: Japanese Unexamined Patent Application Publication No. 2000-231658

BACKGROUND ART

As so-called online shopping, it is possible to purchase a product, for example, at a shopping site established on the Internet. At online shopping, it is possible to make payment for purchase with a credit card.

However, a credit card may be used without realizing overuse. In addition, a user may have a concern for inputting a credit card number on an unfamiliar shopping site.

In view of the above-described situations, payment with a so-called virtual prepaid card (hereinafter referred to as "VP card") has been put to practical use as a payment method for online shopping. Similar to a conventional prepaid card, the VP card is a card with which a sum equivalent to or less than a preliminarily paid sum can be paid. On the other hand, unlike the conventional prepaid card, a VP card does not take a substantial form and is issued as a virtual card of an image. On purchasing a product and or similar service, a user can make payment for purchase by inputting the card number and security code of a VP card.

Since the prepaid sum (value) of a VP card is relatively smaller than a credit limit of a credit card, overuse can be prevented. In addition, although input of a credit card number is still necessary to purchase a VP card, only an input of a card number of the VP card is necessary to purchase a product or similar service, dismissing a concern of telling a shopping site the credit card number.

SUMMARY OF INVENTION

Technical Problem

Since a VP card functions as a voucher with a predetermined value, it is possible to give others a VP card as a gift. When giving a VP card to others as a gift, a giver may desire to manage the use (purchase) of the given VP card. For example, when a parent gives a VP card to a child, the giver (the parent) may desire to check the usage status of the VP card by the recipient (the child).

Meanwhile, a VP card has a period of validity, for example, of a year. In a case where the balance of a VP card is not likely to be used up within the period of validity, a giver of the VP card may desire to use the card for himself/herself.

An object of the present invention is to overcome the above-described problems and enhance a management function of a virtual prepaid card given from a first user to a second user.

Solution to Problem

First, an information processing device according to the present invention includes a card issuing control processing unit, a gift processing unit, a return condition setting processing unit, a display control processing unit and a return condition handling processing unit. The card issuing control processing unit performs a control for issuing a virtual prepaid card such that information on a card number is associated with information on at least a user ID, a value, and an expiration date. The gift processing unit performs a control for, regarding a virtual prepaid card specified as a gift target by a first user, newly forming an association between the virtual prepaid card and a user ID of a second user other than the first user in response to an operation. The return condition setting processing unit sets a return condition regarding the virtual prepaid card specified as a gift target in response to an operation. The display control processing unit performs a control for displaying information on usage status of a gift-given virtual prepaid card to the second user by the gift processing unit, on condition that login with a user ID of the first user is completed. The return condition handling processing unit performs a process of, along with determining whether or not the return condition is fulfilled, at a returning process of the gift-given virtual prepaid card to the first user upon fulfillment of the return condition, performing a control for at least invalidating the association between the virtual prepaid card and a user ID of the second user.

Accordingly, regarding a gift giving function giving a virtual prepaid card possessed by a first user to a second user, new functions are added; a function of setting a return condition for a virtual prepaid card as a gift target, and a function of automatically returning the virtual prepaid card to the first user when the return condition is fulfilled.
Further, the first user can check the usage status of a gift-given virtual prepaid card, on a screen logged in with the user ID of himself/herself.

Second, with the information processing device according to the present invention, the following is preferable. The return condition handling processing unit is configured to perform the returning process in response to an operation, even when the return condition is not fulfilled.

Accordingly, forced returning of a gift-given virtual prepaid card by an operation is enabled.

Third, with the information processing device according to the present invention, the following is preferable. The card issuing control processing unit is configured to perform a control for issuing a virtual prepaid card with a value obtained by adding a balance of a virtual prepaid card possessed by a user to a specified value.

Accordingly, purchase of a new virtual prepaid card to which the balance of a returned virtual prepaid card is added, is enabled.

Forth, with the information processing device according to the present invention, the following is preferable. The information processing device includes a charge control processing unit that performs a control for, regarding a charge for a purchase price of a virtual prepaid card with a specified value issued by the control of the card issuing control processing unit, charging a user a price obtained by subtracting the balance of a virtual prepaid card possessed by the user from a price corresponding to the specified value.

Accordingly, discount purchase of a new virtual prepaid card with the balance of a returned virtual prepaid card is enabled.

Fifth, with the information processing device according to the present invention, the following is preferable. The return condition handling processing unit is configured to perform, at the returning process, a control process for revising a security code or a card number of a virtual prepaid card as a return target, along with invalidation of the association with the user ID of the second user.

Accordingly, prevention of further use by a second user of a returned prepaid card is enabled.

Sixth, with the information processing device according to the present invention, the following is preferable. The information processing device includes a usage restriction setting processing unit for, regarding the virtual prepaid card specified as a gift target, setting usage restriction information in response to an operation.

Accordingly, a certain degree of restriction on use of a gift-given virtual prepaid card is enabled.

Further, an information processing method according to the present invention causes an information processing device to perform a card issuing control processing step of performing a control for issuing a virtual prepaid card such that information on a card number is associated with information on at least a user ID, a value, and an expiration date, a gift processing step of performing a control for, regarding a virtual prepaid card specified as a gift target by a first user, newly forming an association between the virtual prepaid card and a user ID of a second user other than the first user in response to an operation, a return condition setting processing step of setting a return condition regarding the virtual prepaid card specified as a gift target in response to an operation, a display control processing step of performing a control for displaying information on usage status of a gift-given virtual prepaid card to the second user by the gift processing step, on condition that login with a user ID of the first user is completed and a return condition handling processing step of performing a process of, along with determining whether or not the return condition is fulfilled, at a returning process of the gift-given virtual prepaid card to the first user upon fulfillment of the return condition, performing a control for at least invalidating the association between the virtual prepaid card and a user ID of the second user.

With the information processing method according to the present invention, as well as with the information processing device according to the present invention, regarding the gift giving function giving a virtual prepaid card possessed by a first user to a second user, new functions are added; a function of setting a return condition for a virtual prepaid card as a gift target, and a function of automatically returning the virtual prepaid card to the first user when the return condition is fulfilled. Further, the first user can check the usage status of a gift-given virtual prepaid card on a screen logged in with the user ID of himself/herself.

Furthermore, a program according to the present invention is a program causing an information processing device to execute processing as the above information processing method.

In addition, a storage medium according to the present invention is a storage medium storing the above program.

With the program and the storage medium, the above information processing device is executed.

Advantageous Effects of Invention

According to the present invention, a management function of a virtual prepaid card, which is given by a first user to a second user, can be enhanced.

BRIEF DESCRIPTION OF DRAWINGS

FIG. 2 is a diagram illustrating example of storage information of a user database;

FIG. 3 is a diagram illustrating example of storage information of a credit card database;

FIG. 8 is a diagram illustrating example of storage information of a VP card DB;

FIG. 9 is a diagram illustrating an example of a purchased card list page, displayed when the list does not have a virtual prepaid card given to another user;

FIG. 12 is a diagram illustrating example of storage information of a return condition DB;

FIG. 13 is a diagram illustrating an example of the purchased card list page to be displayed when the list has a virtual prepaid card given to another user;

FIG. 14 is a diagram illustrating an example of a detailed card information page for a virtual prepaid card;

FIG. 26 is a diagram illustrating an example of usage restriction information.

DESCRIPTION OF EMBODIMENTS

An embodiment will be described in the following order.
1. Network System
2. Hardware Configuration of Computer device
3. Procedure of Processing from Order Placement to Credit Card Payment
4. Functions Possessed by Information Processing device According to Embodiment
5. Processing Procedure
6. Variations of Embodiment
7. Summary of Embodiment
8. Program and Storage Medium
9. Other Variations Hereinafter, a credit card may be abbreviated as a "C card" and a virtual prepaid card may be abbreviated as a "VP card"

1. Network System

Figure 1:
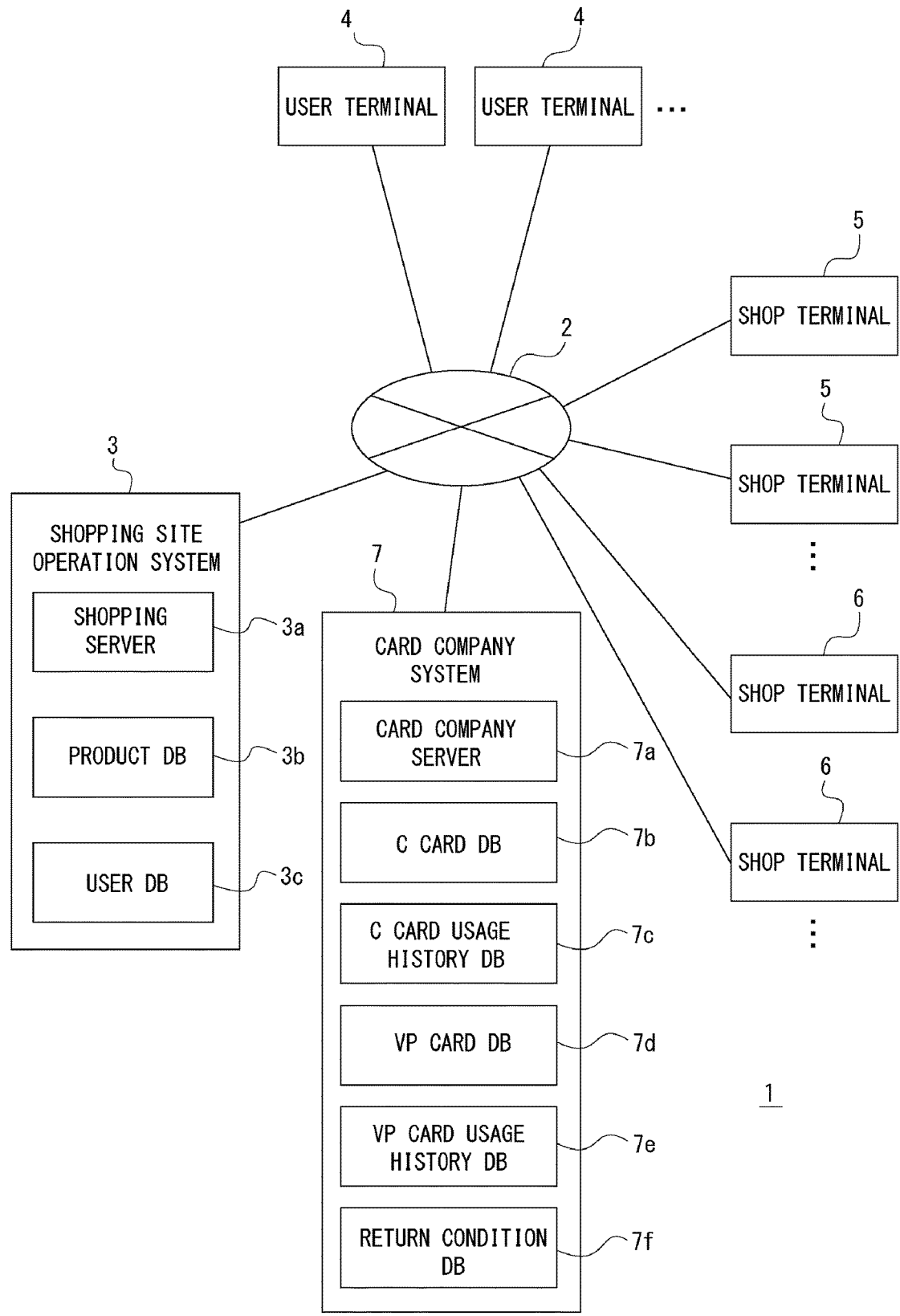
FIG. 1 is a diagram illustrating an example of a network system according to an embodiment.

FIG. 1 describes an example of a network system 1 assumed in the present embodiment. The network system 1 functions as an electronic commerce (EC) system. For example, the network system 1 is configured by a shopping site operation system 3, a plurality of user terminals 4, a plurality of shop terminals 5, a plurality of shop terminals 6, and a card company system 7, each of which is mutually communicable through a network 2, for example, as the Internet.

The user terminal 4 is a computer device having a web browser. The user terminal 4 may be a mobile phone of an advanced function (a smartphone), a mobile phone, a Personal Digital Assistant (PDA), a portable or desktop personal computer (PC). However, types of the user terminal 4 are not limited to those.

The user terminal 4 requests a web page and a predetermined process, by transmitting a Hypertext Transfer Protocol (HTTP) request to a shopping server 3a of the shopping site operation system 3, a card company server 7a of the card company system 7, and the like. The user terminal 4 receives and displays in a web browser the web page transmitted in response to an HTTP request. Accordingly, a user can view and manipulate a desired web page.

The shopping site operation system 3 includes the shopping server 3a, a product database (DB) 3b, and a user DB 3c, each of which is constituted of a computer device. Each of these devices is mutually communicable through a network such as a Local Area Network (LAN).

The shopping server 3a executes various processing according to an HTTP request transmitted from the user terminal 4. For example, processing such as generation and transmission of various web pages, such as a product web page, a shopping cart web page, an order web page, and the like, and purchase processing in response to an order placement operation by a user.

In the network system 1, a web site of a virtual shopping mall (EC site: a shopping site) is provided to a user (the user of the user terminal 4) by the shopping server 3a. A plurality of shops (member shops of a virtual shopping mall) exist in the EC site. A shop employee of each shop registers products of his/her shop through a computer device as the shop terminal 5, so that a variety of products from a variety of shops are uploaded to the EC site. The user can access the EC site through the user terminal 4 and purchase desired products.

In this embodiment, the shop terminal 5 is a terminal of each shop which has set up in the EC site.

On the other hand, the shop terminal 6 is a terminal of each member shop belonging to a credit card brand affiliated by a card company operating the card company system 7.

In the shopping site operation system 3, the product DB 3b stores information related to each registered product through the shop terminal 5. Specifically, information such as a product name, a product genre, a product image, and specifications, product information such as a summary of product introduction, advertisement information, and the like is stored in association with a product ID, which is an identifier to distinguish products.

The product DB 3b also stores product web page files and the like written in a markup language such as Hyper Text Markup Language (HTML) and Extensible Markup Language (XML). With the product DB 3b described above, for example, a product search and the like based on an input keyword and other operations are enabled.

Here, a user can register for membership at the shopping site operation system 3 in order to use the EC site. In the event of membership registration, the user registers required information such as a user ID (user identification information), a password, a name, an email address, a shipping address of a product (a residential address), and a credit card number. Login to the EC site with a registered user ID spares a user a trouble of inputting required information again when purchasing a product at the EC site.

The user DB 3c stores user information registered by a user as a member as described above.

FIG. 2 is a diagram illustrating example of storage information of the user DB 3c.

As illustrated, respective information of a password, a name, an email address, and a residential address and credit card information is stored in association with (is made to correspond to) each user ID in the user DB 3c. As the credit card information, respective information on a card number, a cardholder (a name of a cardholder), and an expiration date are stored.

Referring back to FIG. 1, the card company system 7 includes the card company server 7a, a C card DB 7b, a C card usage history DB 7c, a VP card DB 7d, a VP card usage history DB 7e, and a return condition DB 7f, each of which is constituted of a computer device. Each of these device is mutually communicable through a network such as a Local Area Network (LAN). In addition, each device is capable of communications through the network 2 as the Internet.

The card company server 7a performs processes related to a credit card and a virtual prepaid card.

Here, a virtual prepaid card is managed in association with information on a card number and a security code, as is the case of a credit card. However, the virtual prepaid card is a virtual voucher which lacks a substantial form as a card and whose usage limit amount is determined by a preliminarily purchased value.

When a user desires to make payment with a virtual prepaid card, a user specifies a virtual prepaid card (a card number) to be used and inputs a security code in a product purchase page. When a product purchase (an order) has made, an amount corresponding to a purchase price is subtracted from the balance of the specified virtual prepaid card by the card company server 7a. Thus, payment for purchase is made with a virtual prepaid card.

A virtual prepaid card in this example is assumed to be available not only at the EC site (a shopping site) provided by the shopping server 3a, but also at shopping sites in which shops as member shops of a card brand which is incidental to the virtual prepaid card (shops which manage the shop terminal 6) have set up.

Regarding a credit card, the card company server 7a performs a process of card information management, and processes related to credit inquiry, settlement request, and the like concerning a specified card number.

Regarding a virtual prepaid card, the card company server 7a performs processes of card issuing and card information management (including balance management), and processes related to credit inquiry and settlement request concerning a specified card number.

Details on "the credit inquiry" and the "settlement request" will be described later.

In the network system 1 according to the embodiment, the card company server 7a provides a management site of a credit card and a virtual prepaid card (hereinafter referred to as "a card management site Sc") to members of the EC site provided by the shopping server 3a. In the card management site Sc, on condition that a user has logged in by inputting a user ID and a password, the user is at least capable of performing operations listed below.

(1) reference of card information and usage history information of a credit card possessed by the user
(2) purchase (issue procedure) of a virtual prepaid card
(3) giving a virtual prepaid card as a gift to another user
(4) reference of card information and usage history information of a virtual prepaid card possessed by the user
(5) reference of card information and usage history information of a virtual prepaid card that has been given as a gift At the event of (1) reference of card information and usage history information of a credit card, the card company server 7a employs storage information in the C card DB 7b and the C card usage history DB 7c FIG. 3 illustrates an example of storage information of the C card DB 7b.

As illustrated, on the C card DB 7b, respective information of a credit card on a credit card number, a cardholder, a security cord, a line of credit, an available credit, and an expiration date, is stored in association with each user ID. A line of credit is a maximum amount of card usage set for a predetermined period, for example, a month. An available credit is an amount obtained by subtracting a total sum of card usage for the predetermined period from the line of credit. If the amount of card usage reaches the line of credit at some point in the predetermined period, the available credit turns 0 yen, thus making it impossible to use the card any more until the end of the predetermined period.

For ease of explanation, information on a security code is assumed to be stored in the C card DB 7b. However, practically, for the purpose of security, the information on a security code may be stored in a storage medium other than the C card DB 7b. This also applies to the security cord of a VP card, which will be described later.

Though illustration is omitted, usage history information such as a transaction amount, a transaction date, a transaction shop, and the like is stored on the C card usage history DB 7c, in association with each credit card number.

Each time a credit card is used, information such as a transaction amount, a transaction date, a transaction shop, and the like is newly associated to the credit card number and stored in the card company server 7a.

The event of (2) purchase of a virtual prepaid card refers to purchase of a virtual prepaid card by a user with a credit card. As a virtual prepaid card is purchased by a user, the card company server 7a newly generates a card number and a security code, and causes the VP card DB 7d to store new card information on the card number, the security code, and the like. For each card number of a virtual prepaid card, information on a security code, a user ID of a user purchasing the virtual prepaid card, a cardholder, a value, a balance, and the like, is stored in association with the card number in the VP card DB 7d. Further details will be described later.

Processes performed by the card company server 7a in response to the above-described "purchase of a virtual prepaid card" will also be described later.

The event of (3) giving a virtual prepaid card as a gift to another user refers to an action of a user possessing a virtual prepaid card (a first user) to give (transfer) the virtual prepaid card to another user (a second user). A user that can be designated as a gift recipient of a virtual prepaid card is limited to users who have registered membership for the EC site.

Processes necessary to execute a gift function of the virtual prepaid card will be described later.

In the event of (4) and (5) reference of card information and usage history information of a virtual prepaid card, the card company server 7a employs storage information of the VP card DB 7d and the VP card usage history DB 7e.

In the VP card DB 7d, information on a user ID of a user purchasing the virtual prepaid card, a cardholder, a value, a balance, and the like, is stored in association with each card number of a virtual prepaid card. Further details will be described later.

In addition, though illustration is omitted, usage history information such as a transaction amount, a transaction date, a transaction shop, and the like is stored in the VP card usage history DB 7e, in association with each card number of a virtual prepaid card.

Each time a virtual prepaid card is used, information such as a transaction amount, a transaction date, a transaction shop, and the like is newly associated with the card number of the virtual prepaid card and stored in the VP card usage history DB 7e by the card company server 7a.

The return condition DB 7f will be described later.

In FIG. 1, various examples can be conceived for the configuration of the network 2. The network 2 may be, for example, the Internet, an intranet, an extranet, a Local Area Network (LAN), Community Antenna Television (CATV) communication network, Virtual Private Network, a telephone line network, a mobile communication network, a satellite network, and the like.

Various examples can also be conceived for a communication medium that forms the whole or a part of the network 2. For example, wired media such as Institute of Electrical and Electronics Engineers (IEEE) 1394, Universal Serial Bus (USB), power line transmission, and a telephone line, or wireless media such infrared, like Infrared Data Association (IrDA), Bluetooth®, 802.11 wireless, and a mobile telephone network, a satellite line, and a terrestrial digital network, may be available.

2. Hardware Configuration of Computer Device

Figure 4:
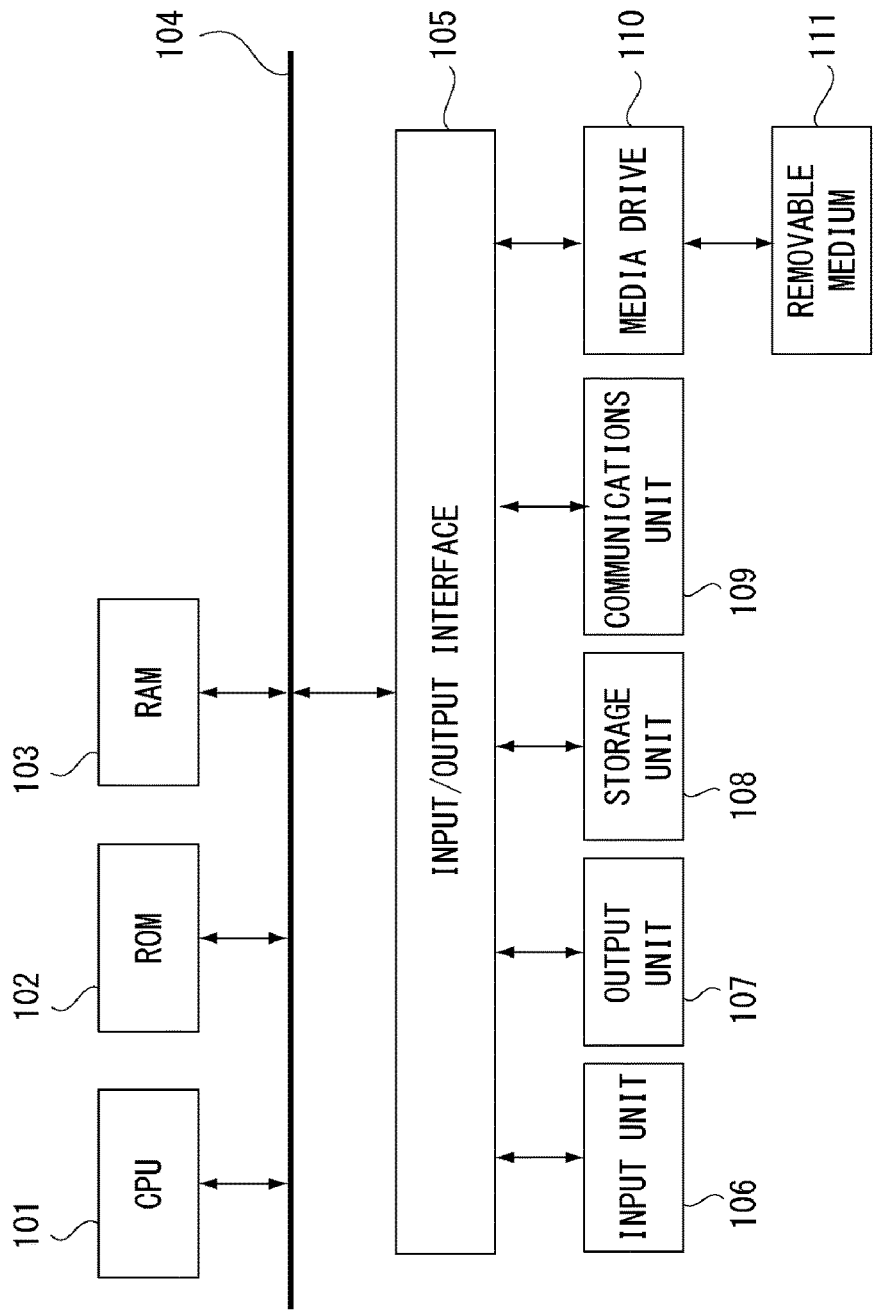
FIG. 4 is a block diagram illustrating a computer device according to an embodiment.

FIG. 4 illustrates the hardware configuration of a computer device forming each of the devices, illustrated in FIG. 1, specifically, the shopping server 3a, the product DB 3b, the user DB 3c, the user terminal 4, the shop terminal 5, the shop terminal 6, the C card DB 7b, the C card usage history DB 7c, the VP card DB 7d, the VP card usage history DB 7e, and the return condition DB 7f, in addition to the card company server 7a, In FIG. 4, a Central Processing Unit (CPU) 101 of a computer device performs various processes according to a program stored in a Read Only Memory (ROM) 102 or a program loaded from a storage unit 108 to a Random Access Memory (RAM) 103. Data required for the CPU 101 to perform various processes and the like is also stored in the RAM 103 as appropriate.

The CPU 101, the ROM 102, and the RAM 103 are connected to each other via a bus 104. An input/output interface 105 is also connected to the bus 104.

An input unit 106, an output unit 107, the storage medium 108, and a communications unit 109 are connected to the input/output interface 105. The input unit 106 includes a keyboard, a mouse, a touch panel, and the like. The output unit 107 includes a display (a display device) including a Liquid Crystal Display (LCD), Cathode Ray Tube (CRT) and an organic Electroluminescence (EL) panel, and a speaker, and the like. The storage unit 108 includes a Hard Disk Drive (HDD), a flash memory device, and the like. The communications unit 109 mutually communicates with an external device.

In addition, a media drive 110 is connected to the input/output interface 105 as necessary. A removable medium 111 such as a magnetic disk, an optical disk, a magneto-optical disk, and semiconductor memory is connected as necessary, so that information can be written on and read from the removable medium 111.

The computer device is capable of uploading and downloading data and a program through communications by the communications unit 109, and also of transmitting and receiving data and a program through the removable medium 111.

The CPU 101 performs processes according to various programs, so that information processing and communications as will be described later can be executed in a computer device, in particular, as the card company server 7a.

3. Procedure of Processing from Order Placement to Credit Card Payment

Figure 5:
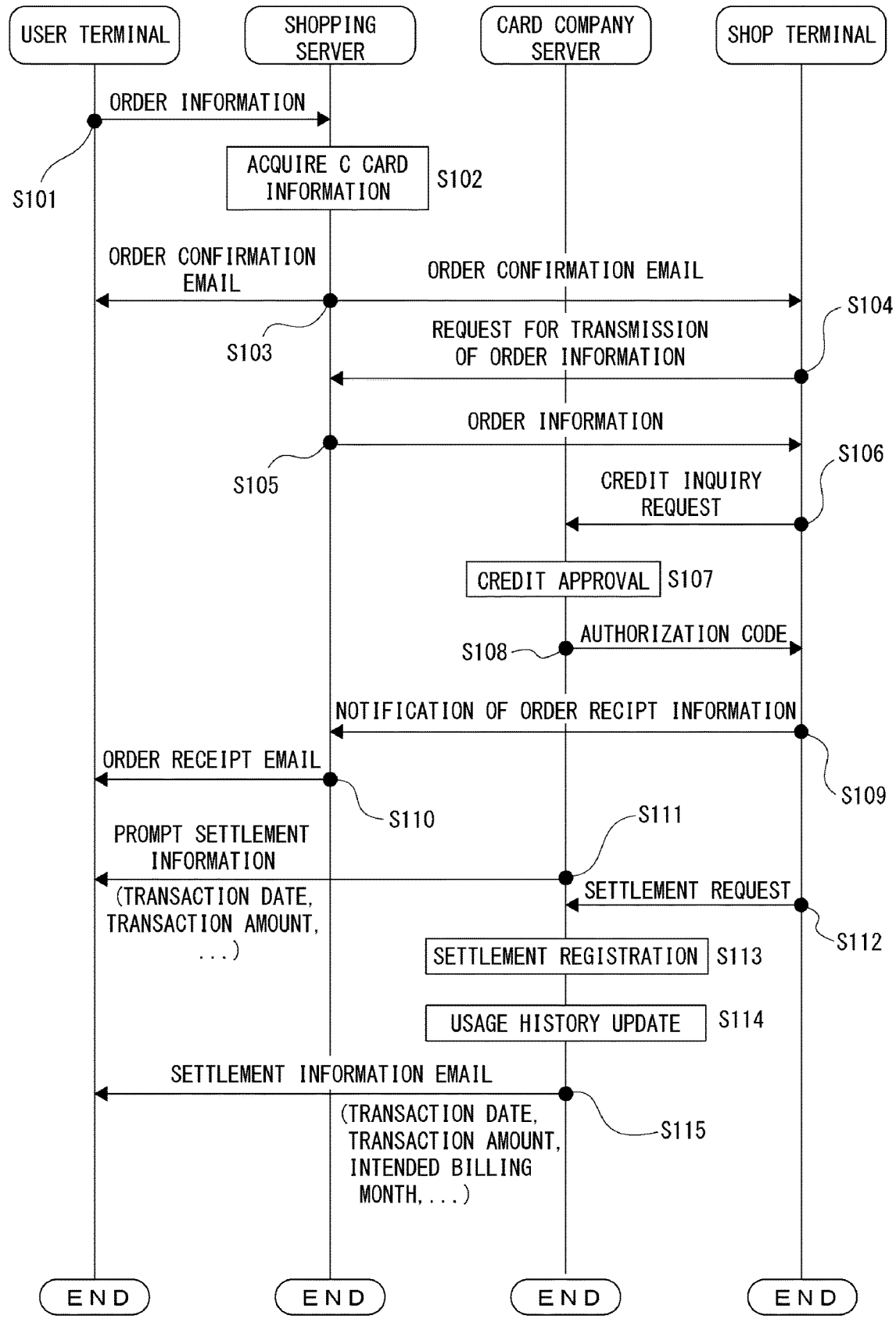
FIG. 5 is a flowchart illustrating procedure from order placement to credit card payment.

With reference to the flowchart in FIG. 5, processing of order information received from the user terminal 4 and processing of credit card payment concerning order information, both of which performed by the shopping server 3a, are described.

In FIG. 5, "shop terminal" is a terminal of a shop that has set up in the EC site provided by the shopping server 3a (the shop terminal 5). In FIG. 5, a performing agent of a process of each device is the CPU 101 of the respective device.

In FIG. 5, the user terminal 4 firstly logins to the shopping server 3a, inputs necessary information in a product purchase page of a virtual shop acquired from the shopping server 3a, then transmits order information to the shopping server 3a (Step S101). The order information includes, for example, a user ID, a shop ID, a product ID, product quantity, and payment specification information. The payment specification information may include, for example, information on a credit card to be used, and information specifying credit card information stored in the user DB 3c in association with a user ID.

Based on the order information received from the user terminal 4, the shopping server 3a acquires credit card information to be used for making payment for the order information (Step S102).

Subsequently, the shopping server 3a transmits an order confirmation notice (an order confirmation email) to the shop terminal 5 and the user terminal 4 (Step S103).

On receiving the order confirmation notice, the shop terminal 5 transmits to the shopping server 3a a request for transmission of the order information (Step S104).

After receiving the request for transmission of the order information from the shop terminal 5, the shopping server 3a transmits the order information concerning the received transmission request to the shop terminal 5 (Step S105).

The shop terminal 5 transmits to the card company server 7a a credit inquiry request, based on a payment amount, which is calculated based on the order information received from the shopping server 3a, and a credit card number included in the order information (Step S106).

In response to the credit inquiry request from the shop terminal 5, the card company server 7a performs credit approval based on the result of credit inquiry (Step S107), then transmits the result (authorization code) to the shop terminal 5 (Step S108.) At Step S107, the card company server 7a acquires from the C card DB 7b the information on an available credit associated with the card number received from the shop terminal 5, then determines whether or not the payment amount does not exceed the available credit. The credit approval is thus performed based on the result of determination. That is, the credit approval is performed based on the result of the credit inquiry.

Though explanation with a diagram is omitted, in a case where a payment amount exceeds an available credit (a case where the result of credit inquiry is not valid), the card company server 7a does not approve credit, and perform a process to notify the shop terminal 5 (and the user terminal 4) by an email or the like that a payment process cannot be performed since the payment amount exceeds the available credit.

On receiving the authorization code, the shop terminal 5 notifies the shopping server 3a of order receipt information (Step S 109).

On receiving the order receipt information from the shop terminal 5, the shopping server 3a sends an order receipt email to the email address of a user (the user terminal 4) for notification (Step S110).

At a predetermined point after the credit approval, the card company server 7a sends prompt information on settlement (such as a transaction date and a transaction amount) of a credit card number to the email address of a user, for notification (Step S111).

At a predetermined point of a settlement request, the shop terminal 5 transmits to the card company server 7a a settlement request based on the credit card number and the authorization code (Step S112).

Based on the settlement request from the shop terminal 5, the card company server 7a registers the payment amount, which is associated with the authorization code corresponding to the card number, as a settlement (Step S113). Furthermore, for the card number for which a settlement request is made from the shop terminal 5, the card company server 7a performs an updating process of the C card usage history DB 7c, so that usage history information related to the current settlement, such as a transaction amount (a payment amount), a transaction date, and a transaction shop, is added (Step S114).

Though illustration is omitted, when the card company server 7a registers settlement in response to a settlement request from the shop terminal 5, the card company server 7a performs an updating process on an available credit in the C card DB 7b, as well as the above-described updating process of the C card usage history DB 7c. Specifically, it is the process in the C card DB 7b updates the value of the available credit associated with the card number for which a settlement request is made based on the current settlement. That is, a process that subtracts the settlement amount from the available credit.

At a predetermined point after settlement registration, the card company server 7a sends settlement information (a transaction date, a transaction amount, an intended billing month, a payment option, a transaction shop, and the like), which is based on the registered settlement regarding a credit card number, to an email address of a user for notification (Step S115). Here, the payment option refers to an option such as paying in full or in installments.

A credit card is assumed to be available not only at the shops setting up in the EC site provided by the shopping server 3a (shops managing the shop terminals 5), but also at member shops of the card brand which is incidental to the credit card.

When a user orders (purchases) products with a credit card specified as a payment method at the shopping site where the above-mentioned member shops have set up, the procedure of processing from order placement to credit card payment is identical to the procedure of processing described above, except that the performing agent of the processing, shown as "shopping server" in FIG. 5, is not the shopping server 3a but a server device providing the above-described shopping site, and that the performing agent of the processing, shown as "shop terminal", is not the shop terminal 5 but the shop terminal 6. Thus, overlapping explanation is avoided.

4. Functions Included in Information Processing Device According to Embodiment With reference to the functional block diagram in FIG. 6, functions included in the card company server 7a according to the embodiment are described.

Figure 6:
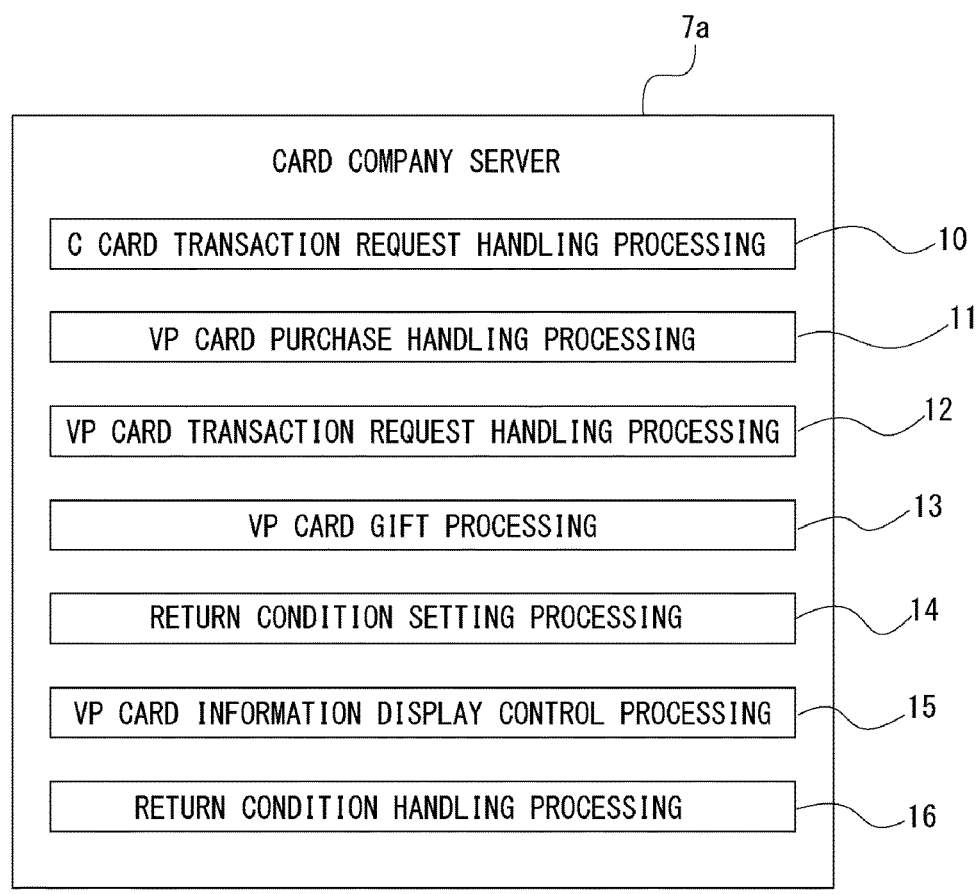
FIG. 6 is a functional block diagram illustrating functions related to the present invention among the functions included in an information processing device according to an embodiment.

In FIG. 6, the card company server 7a includes functions as a C card transaction request handling processing unit 10, a VP card purchase handling processing unit 11, a VP card transaction request handling processing unit 12, a VP card gift processing unit 13, a return condition setting processing unit 14, a VP card information display control processing unit 15, and a return condition handling processing unit 16.

The C card transaction request handling processing unit 10 performs processes for a credit inquiry request and a settlement request concerning credit card transaction, both of which are performed by the shop terminal 5 of the shop setting up in the EC site provided by the shopping server 3a or by the shop terminal 6 of the shop setting up in another shopping site. Specifically, the C card transaction request handling processing unit 10 performs the processes at Steps S107, S108, S111, S113, S114, and S115 shown as the processes by the card company server 7a in FIG. 5.

The VP card purchase handling processing unit 11 performs processes corresponding to an event of purchasing a virtual prepaid card.

Purchase of a virtual prepaid card is made possible in the card management site Sc provided by the card company server 7a.

Figure 7:
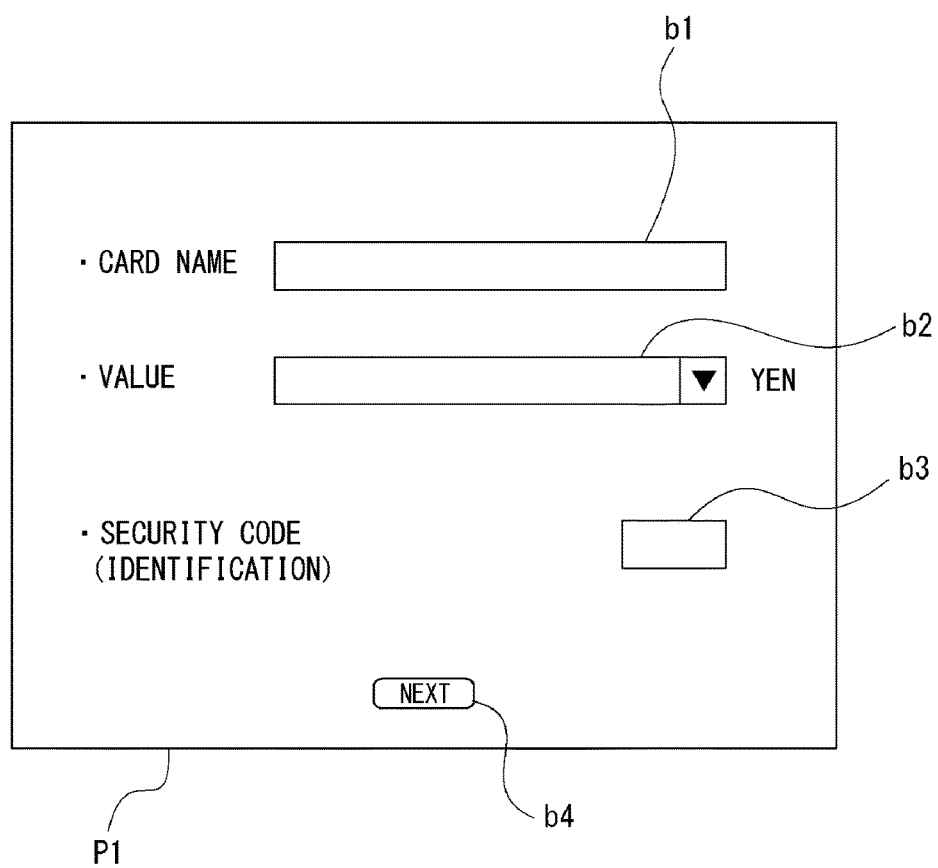
FIG. 7 is a diagram illustrating an example of a virtual prepaid card purchase page to be displayed when a possessed virtual prepaid card does not exist.

FIG. 7 illustrates an example of a purchase page P1 of a virtual prepaid card. Visiting the card management site Sc, a user can display the purchase page P1, for example, by clicking a link to the purchase page P1, which is present on the front page of the card management site Sc. At this time, in order to display the purchase page P1, login to the card management site Sc by inputting a user ID and a password is required.

As illustrated, the purchase page P1 displays a card name input box b1, a value input box b2, a security code input box b3, and a "Next" button b4: The card name input box b1 is for inputting a card name to be assigned to a virtual prepaid card, the value input box b2 is for inputting a value, the security code input box b3 is for inputting a security code, and the "Next" button b4 is for proceeding to a next page.

In the card name input box b1, an arbitrary character may be inputted, and thus a user can assign an arbitrary name to a virtual prepaid card that is newly purchased. The value input box b2, in this example, is an input box in which an arbitrary value can be selected from a plurality of prearranged values in a pull-down menu. For example, options that can be selected are; 500 yen, 1,000 yen, and higher values up to 20,000 yen increasing by 1,000 yen.

In the security code input box b3, a security code of the credit card registered corresponding to a user ID, with which login has conducted, is to be inputted for the purpose of identification. In this example, a virtual prepaid card is purchased by using a credit card that has been registered in the EC site provided by the shopping server 3a. That is, the payment for a virtual prepaid card is made with the credit card. Accordingly, the security code input box b3 requires input of the security code of the credit card that has been registered in the EC site.

When the "Next" button b4 is clicked on the purchase page P1, a confirmation page P11 (illustration is omitted) for confirming the information inputted in the purchase page P1 is displayed. The confirmation page P11 displays a "Previous" button to go back to the purchase page P1, and a "Purchase" button to settle a purchase, along with information inputted to the purchase page P1. When the input information is inaccurate, a user can click the "Previous" button and correct the input information. Meanwhile, a user can instruct a purchase (issue) of a virtual prepaid card to the card company server 7a (the VP card purchase handling processing unit 11) by clicking the "Purchase" button.

The VP card purchase handling processing unit 11 performs a display control process for causing the above-described purchase page P1 and the confirmation page P11 to be displayed to a user in the user terminal 4, and in response to the clicking of the "Purchase" button on the confirmation page P11 also performs an identification process using the security code inputted in the purchase page P1. In addition, when the identification is valid, the VP card purchase handling processing unit 11 performs a determination process for determining whether a purchase amount of a virtual prepaid card (in this example, an amount equivalent to the value inputted in the value input box b2) does not exceed an available credit, in an authorization process of a credit card used for the purchase of the virtual prepaid card. When the authorization is valid, the VP card purchase handling processing unit 11 performs a control for issuing a virtual prepaid card whose card number information is associated with at least information on a user ID, a security code, a value, and an expiration date. Specifically, the VP card purchase handling processing unit 11 performs a process of updating storage information of the VP card DB 7*d*, so that the respective information, being associated with one another, is added to the VP card DB 7*d* illustrated in FIG. 1.

FIG. 8 illustrates an example of storage information of the VP card DB 7*d*. As illustrated, for each card number of a virtual prepaid card, respective information on a cardholder (information on a virtual prepaid card cardholder), a security code, a card name, a value, a purchase date, an expiration date, a balance, a purchaser user ID, a recipient user ID, being associated with one another, is stored in the VP card DB 7*d*

When the result of above-described credit inquiry is valid, the VP card purchase handling processing unit 11 generates a card number and a security code of a new virtual prepaid card, and then causes the VP card DB 7*d* to store respective information on a cardholder, a card name, a value, a purchase date, an expiration date, a balance, and a purchaser user ID, in addition to information on the card number and the security code.

In this process, as the information on a card name and a value, the information inputted in the purchase page P1 is stored. As the information on a balance, amount information equivalent to a value is stored. As the information on a purchaser user ID, a user ID belonging to a purchaser of the virtual prepaid card is stored. As the information on a cardholder, information on a name acquired from the user DB 3*c* based on the purchaser user ID is stored, or information on a cardholder of the credit card, with which the virtual prepaid card is purchased, is acquired from the C card DB 7*b* and stored. As the information on a purchase date, a date at the time of the purchase is stored, and as information on an expiration date, information on a year and a month obtained by adding a preliminarily arranged number of months to the year and the month at the time of the purchase is stored. In this example, a period of validity of a virtual prepaid card is a year, and the above-described preliminarily arranged number of months is set as 12 months.

Further, information on a recipient user ID is information to be stored in the VP card DB 7*d* in response to an event of giving a virtual prepaid card as a gift. Further details will be described later.

When the result of above-described credit inquiry is valid, the VP card purchase handling processing unit 11 performs processes described in FIG. 5, that is, a process of prompt settlement information notification (Step S111), a process of settlement registration (Step S113), a process of usage history update (Step S114), and a process of settlement information notification (Step S115) concerning credit card payment for purchase of a virtual prepaid card.

When a virtual prepaid card possessed by a user exists, the VP card purchase handling processing unit 11 performs processes concerning combined purchases in response to the instruction of a user. The details of the processes will be described later.

Next, the VP card transaction request handling processing unit 12 shown in FIG. 6 is described.

The VP card transaction request handling processing unit 12 performs processes responding to a credit inquiry request and a settlement request concerning a virtual prepaid card transaction, performed by the shop terminal 5 setting up in the EC site provided by the shopping server 3*a* or the shop terminal 6 setting up in another shopping site. Specifically, the VP card transaction request handling processing unit 12 performs processes corresponding to the processes of the respective Steps S107, S108, S111, S113, S114, and S115 concerning a virtual prepaid card transaction.

The VP card transaction request handling processing unit 12 determines whether or not a condition that a transaction amount by a virtual prepaid card does not exceed the balance stored in the VP card DB 7*d* is satisfied, as a credit inquiry in response to the request from the shop terminal 5 or the shop terminal 6 (Step S106), and when the condition is satisfied, the VP card transaction request handling processing unit 12 performs credit approval and notification of an authorization code as the processes at the credit approval at Step S107 and the notification of an authorization code at Step S108.

As the process of settlement registration at Step S113, which is performed in response to the settlement request from the shop terminal 5 or the shop terminal 6 (Step S112), the VP card transaction request handling processing unit 12 performs a process of updating a balance stored in the VP card DB 7*d*, based on a requested settlement amount. That is, it is the process that a balance associated with the card number for which the settlement request is made in the VP card DB 7*d* is updated based on the requested settlement amount (that is, it is a process that the settlement amount is subtracted from the balance).

In this case, the process of usage history update at Step S114 is performed, for updating the storage information in the VP card usage history DB 7*e* as a target. That is, the VP card transaction request handling processing unit 12 performs an update process of the storage information in the VP card usage history DB 7*e*, so that to the card number, for which a settlement request is made from the shop terminal 5 or the shop terminal 6, usage history information concerning the purchase of this time (a transaction amount, a transaction date, a transaction shop, and the like) is added.

In this case, at settlement information notification processes at Steps S111 and S115, information on an intended billing date and a payment option, which is peculiar to a credit card, is not transmitted.

The VP card gift processing unit 13 performs a control for newly associating between a virtual prepaid card specified as a gift target by a first user and the user ID of a second user other than the first user in response to an operation.

In this example, selection of a virtual prepaid card as a gift target can be made in a purchased card list page P2 prepared in the card management site Sc. The purchased card list page P2 is a page for displaying a list of virtual prepaid cards purchased by a logged-in user.

FIG. 9 illustrates an example of the purchased card list page P2.

The purchased card list page P2 displays; respective information on a card name, an expiration date, a purchase date, and a value of each virtual prepaid card within a period of validity which the logged-in user purchased; a Detail button b5; and a "Give a Gift" button b6.

The Detail button b5 is a button for instructing transition to a detailed card information page that displays a balance and usage history information of a virtual prepaid card.

When a user selects a virtual prepaid card as a gift target among the virtual prepaid cards displayed in the purchased card list page P2, a user clicks the "Give a Gift" button b6 of the corresponding virtual prepaid card.

In the purchased card list page P2, when a gift-given virtual prepaid card given to another user exists among the purchased virtual prepaid cards, the gift-given virtual prepaid card is also displayed. Further details will be described later, with reference to a purchased card list page P2' of FIG. 13.

Figure 10:
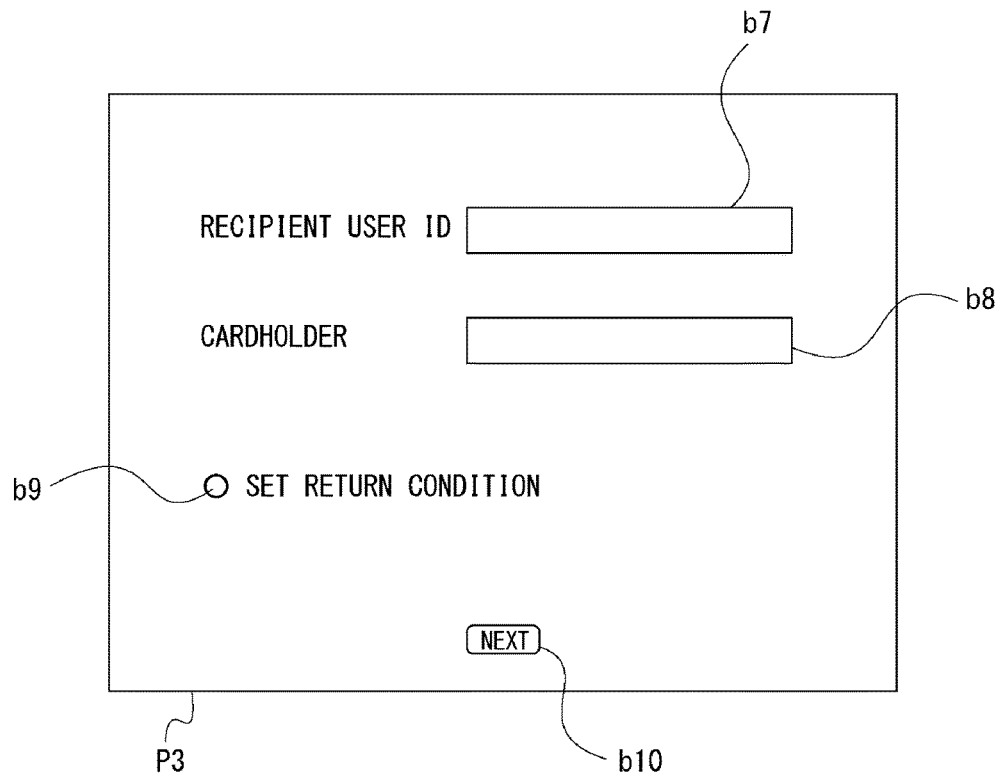
FIG. 10 is a diagram illustrating an example of a gift-related information setting page.

When the "Give a Gift" button b6 in the purchased card list page P2 is clicked, the VP card gift processing unit 13 performs a control for causing a gift-related information setting page P3, as illustrated in FIG. 10, to be displayed in the user terminal 4.

In FIG. 10, the gift-related information setting page P3 displays the following: a recipient ID input box b7, a cardholder input box b8, a return condition checkbox b9, and a "Next" button b10. The recipient ID input box b7 is for inputting the user ID of a recipient. The cardholder input box b8 is for inputting the information on a cardholder of a virtual prepaid card to be given. The return condition checkbox b9 is for choosing whether or not to set a return condition of a gift-given virtual prepaid card. The "Next" button b10 is for instructing transition to a next page.

In the recipient ID input box b7, a user ID of a user, to whom the virtual prepaid card selected in the purchased card list page P2 is given (that is, a user to be a recipient of the prepaid card), is to be inputted as the recipient user ID. In the cardholder input box b8, information on a name of the recipient is to be inputted.

A user performs information input to the recipient ID input box b7 and the cardholder input box b8. The user checks the return condition checkbox b9 as necessary, and then clicks the "Next" button 10.

Depending on whether or not the return condition checkbox b9 is checked, a page to be displayed in response to the click of the "Next" button b10 differs. When the "Next" button b10 is clicked without checking the return condition checkbox b9, as a confirmation page of the input information to the gift-related information setting page P3, a page including the input information to the recipient ID input box b7 and the cardholder input box b8, information telling that the return condition is not set, a "Previous" button for returning to the gift-related information setting page P3, and an "Execute" button for instructing execution of gift giving (hereinafter referred to as a "confirmation page P13") is displayed.

Figure 11:
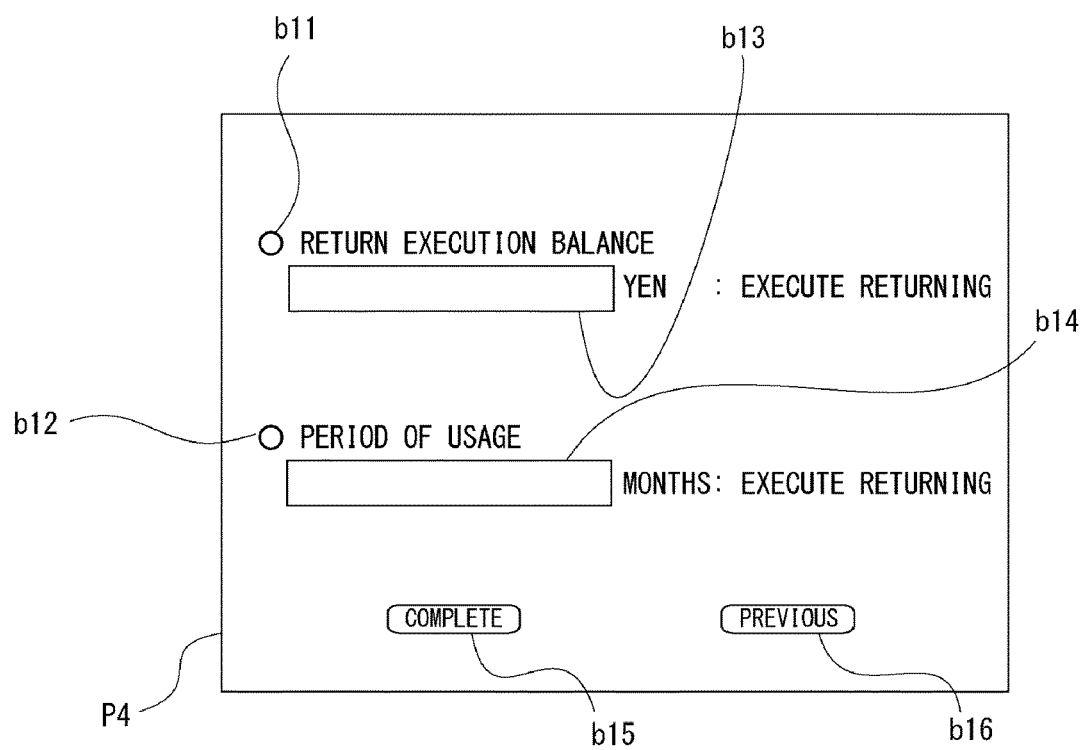
FIG. 11 is a diagram illustrating an example of a return condition setting page.

On the other hand, when the "Next" button b10 is clicked with checking the return condition checkbox b9, a return condition setting page P4, which will be described later in FIG. 11, is first displayed, and then a confirmation page for the input information (hereinafter referred to as a "confirmation page P14") is displayed. As will be described later, in the confirmation page this time, the input information to the return condition setting page P4, as well as the input information to the gift-related information setting page P3, is displayed.

In response to the instruction of execution of gift giving which specifies a recipient user ID by clicking the "Execute" button in the above confirmation page (P13 or P14), the VP card gift processing unit 13 performs a control for newly associating the recipient user ID with a virtual prepaid card as a gift target. Specifically, the VP card gift processing unit 13 performs a control for causing the information on a user ID inputted in the recipient ID input box b7 to be newly stored as the information of a recipient user ID associated with the card number of the virtual prepaid card for which the "Give a Gift" button b6 has been clicked in the purchased card list page P2, among the card numbers stored in the VP card DB 7d. With this control, the VP card gift processing unit 13 updates the information on a cardholder associated with the card number in the VP card DB 7d to the information inputted in the cardholder input box b8.

By newly associating a recipient user ID in the VP card Db 7d as described above, a target virtual prepaid card can be managed as a gift given to the user identified with a recipient user ID.

Furthermore, the VP card gift processing unit 13 in this example revises a security code regarding a virtual prepaid card with which gift giving is executed. Specifically, the VP card gift processing unit 13 generates a new security code in response to an instruction of execution of gift giving which specifies a recipient user ID, and performs a control for storing the generated security code as the security code of a virtual prepaid card specified as a gift target in the VP card DB 7d. Further, after performing such process of security code update in the VP card DB 7d as described above, the VP card gift processing unit 13 notifies by email the information on an updated security code to the user terminal 4 of a user as a recipient.

Accordingly, a gift-given virtual prepaid card is made unavailable for a user as a purchaser any longer, but available only for a user as a recipient.

The return condition setting processing unit 14 illustrated in FIG. 6 sets a return condition regarding a virtual prepaid card specified as a gift target, in response to an operation. When the "Next" button b10 is clicked with the return condition checkbox b9 checked in the gift-related information setting page P3, the return condition setting page P4 illustrated in FIG. 11 is displayed. The return condition setting processing unit 14 sets a return condition based on input information to the return condition setting page P4 as displayed above.

In this example, two items available to be set for returning are a "return execution balance" and a "period of usage". In a case where a return execution balance is set, when the balance of a gift-given virtual prepaid card is below the return execution balance, the virtual prepaid card is returned to a purchaser. In a case where a period of usage is set, a virtual prepaid card is returned to a purchaser after passing the period specified as a period of usage.

In the return condition setting page P4 illustrated in FIG. 11, the following are displayed: a balance setting checkbox b11, a period setting checkbox b12, a balance input box b13, a period input box b14, a "Complete" button b15, and a "Previous" button b16. The balance setting checkbox b11 is for instructing setting of a return execution balance. The period setting checkbox b12 is for instructing setting of a period of usage. The balance input box b13 is for inputting a return execution balance. The period input box 14 is for inputting a period of usage. The "Complete" button b15 is to be operated when rerun condition input is completed. The "Previous" button b16 is for returning to the gift-related information setting page P3.

When setting a return execution balance, a user checks the balance setting checkbox b11 and also inputs a desired balance in the balance input box b13. When setting a period of usage, a user checks the period setting checkbox b12 and also inputs a desired period (in this example, by month), in the period input box b14. In this example, both conditions of a return execution balance and a period of usage can be set. In this case, returning of a gift-given virtual prepaid card is conducted when either return condition of a return execution balance or of a period of usage is fulfilled.

By clicking the "Complete" button b15, a user can instruct transition to the confirmation page P14 (illustration is omitted) for confirming the information on a recipient user ID and a cardholder, which is inputted in the gift-related information setting page P3, and information inputted in the return condition setting page P4. In the confirmation page P14, the "Execute" button is provided for instructing execution of gift giving following the information displayed in the confirmation page P14. By clicking the "Execute" button, regarding a virtual prepaid card for which the "Give a Gift" button b6 is clicked, a user can instruct the performance of the gift processing with a user whose user ID is inputted in the recipient ID input box b7 as a recipient, and also can instruct setting of a return condition inputted in the return condition setting page P4.

The return condition setting processing unit 14 performs a return condition setting process in response to the clicking of the "Execute" button in the confirmation page P14, which is displayed after the return condition setting page P4 as described above, and the instruction for setting the return condition to the return condition setting page P4. That is, the return condition setting processing unit 14 performs a control for updating the storage information in the return condition DB 7f illustrate in FIG. 1, based on the information inputted in the return condition setting page P4.

FIG. 12 illustrates an example of storage information of the return condition DB 7f.

In the return condition DB 7f, the information on a return execution balance and/or a period of usage is stored in association with each card number of a virtual prepaid card.

The return condition setting processing unit 14 performs a process of causing the information on a return execution balance and/or a period of usage, which are inputted to the return condition setting page P4, to be stored in the return condition DB 7f in association with the number of a virtual prepaid card for which the "Give a Gift" button b6 is clicked, at the above-described return condition setting process.

The VP card information display control processing unit 15 illustrated in FIG. 6 performs a control for displaying the information on usage status of a virtual prepaid card given by a user as a purchaser to another user on condition that login is completed with the user ID of the user as the purchaser.

In this example, when a user as a purchaser refers to the information on usage situation of a gift-given virtual prepaid card, the user accesses a list page of purchased prepaid cards. In order to access the list page of purchased prepaid cards, a user is required to login with the user ID of his/her own.

FIG. 13 illustrates an example of the purchased card list page P2' displayed when a card given as a gift exists among one or more purchased prepaid cards.

In the purchased card list page P2', both a gift-given virtual prepaid card given to another user and a virtual prepaid card not given to another user, among virtual prepaid cards within the period of validity purchased by a logged-in user, are displayed.

Regarding a virtual prepaid card not given to another user, respective information on a card name, an expiration date, a purchase date, and a value, the Detail button b5, and the "Give a Gift" button b6 are displayed, as is the case in the above purchased card list page P2 (FIG. 9).

Regarding a gift-given virtual prepaid card, respective information on a recipient name (a cardholder inputted in the gift-related information setting page P3), a card name, an expiration date, a purchase date, and a value, a Detail button b17, and a "Return" button b18 are displayed.

The Detail button b17 is a button for instructing transition to a detailed card information page P5 that displays information on a balance, information on a usage history, and the like, regarding a gift-given virtual prepaid card.

Details on the "Return" button b18 will be described later.

FIG. 14 illustrates an example of the detailed card information page P5.

In the detailed card information page P5, regarding a virtual prepaid card on which the Detail button b17 is clicked, the respective information on a recipient name, a card name, an expiration date, a vale, a balance and a return execution balance and/or a period of usage, and the usage history information associated with the card number are displayed. In this example, as usage history information, the information on a transaction shop, a transaction date, and a transaction amount is displayed with respect to each card usage.

The column for the respective information on a return execution balance or a period of usage is blank, when either condition is not set.

In response to a web page request (a page request) transmitted by the user terminal 4 by the clicking of the Detail button b17, the VP card information display control processing unit 15 performs a control for displaying the above-described detailed card information page P5 in the user terminal 4.

Based on the card number of a virtual prepaid card for which the Detail button b17 is clicked, the VP card information display control processing unit 15 acquires the following information from the VP card DB 7d: respective information on a recipient name, a card name, an expiration date, a value, a balance, a return execution balance, and a period of usage. Regarding a recipient name, information on a cardholder in the VP card DB 7d is acquired.

Further, regarding the usage history information (information on a transaction shop, a transaction date, and a transaction amount for each card usage) to be displayed in the detailed card information page P5, the VP card information display control processing unit 15 acquires the information from the VP card usage history DB 7e, based on the number of a virtual credit card on which the Detail button b17 is clicked.

Regarding a virtual prepaid card for which a return condition is set, the return condition handling processing unit 16 illustrated in FIG. 6 performs a process of determining whether or not the return condition is fulfilled and returning the virtual prepaid card to a user as a purchaser in response to the fulfillment of the return condition.

At the returning process, the return condition handling processing unit 16 performs a control process for invalidating an association of a virtual prepaid card whose return condition is fulfilled with a recipient user ID in the VP card DB 7d. Specifically, information on the recipient user ID is deleted. By invalidating an association with a recipient user ID in the VP card DB 7d as described above, a state that the virtual prepaid card has been given to another user is invalidated. Accordingly, regarding the virtual prepaid card, a possessor is hereafter identified by a purchaser user ID associated with the card number in the VP card DB 7d. As a result, the gift-given virtual prepaid card is able to be managed as being returned to a user as the purchaser.

In addition, when returning a virtual prepaid card, the return condition handling processing unit 16 causes information on a cardholder in the VP card DB 7d to be revised. That is, the return condition handling processing unit 16 performs a control for revising information on the cardholder, which is associated with a card number of a virtual prepaid card as a returning target in the VP card DB 7d, from name information on a recipient to name information on a purchaser. Regarding name information on a purchaser, the return condition handling processing unit 16 may acquire information on a cardholder in the C card DB 7b (FIG. 3) or information on a name in the user DB 3c (FIG. 2), based on the user ID of the purchaser of a virtual prepaid card as a returning target (a purchaser user ID in the VP card DB 7d).

The return condition handling processing unit 16 performs the returning process of a virtual prepaid card not only when a preliminarily set return condition is fulfilled, but also in response to a user operation. That is, the return condition handling processing unit 16 performs the returning process as described above by invalidation of association with a recipient user ID regarding the virtual prepaid card, when the "Return" button b18 in the purchased card list page P2' (FIG. 13) is clicked.

In addition, when returning a virtual prepaid card, the return condition handling processing unit 16 in this example performs a process of revising the security code of the virtual prepaid card. Specifically, regarding a virtual prepaid card as a returning target, the return condition handling processing unit 16 generates a new security code and causes information on the generated security code to be stored in place of information on a security code associated with a card number, which is stored in the VP card DB 7d.

At this processing, the return condition handling processing unit 16 notifies the user terminal 4 of a return target user (a user as a purchaser of the virtual prepaid card) of the information on the newly generated security code by email. Thus, regarding a returned virtual prepaid card, a state that further use by a returning user (a gift target user) is impossible and only use by a return target user is possible, can be ensured.

In the following, a combined purchases process performed by the VP card purchase handling processing unit 11 is described.

In order to handle a case where a user possessing a virtual prepaid card purchases a new virtual prepaid card, the VP card purchase handling processing unit 11 performs a process for adding the balance of a virtual prepaid card in possession to a value of a new purchased virtual prepaid card. For example, when the value of a virtual prepaid card to be newly purchased is 10,000 yen and the balance of a virtual prepaid card in possession is 500 yen, a card with a value of 10,500 yen is issued as a newly purchased virtual prepaid card.

Figure 15:
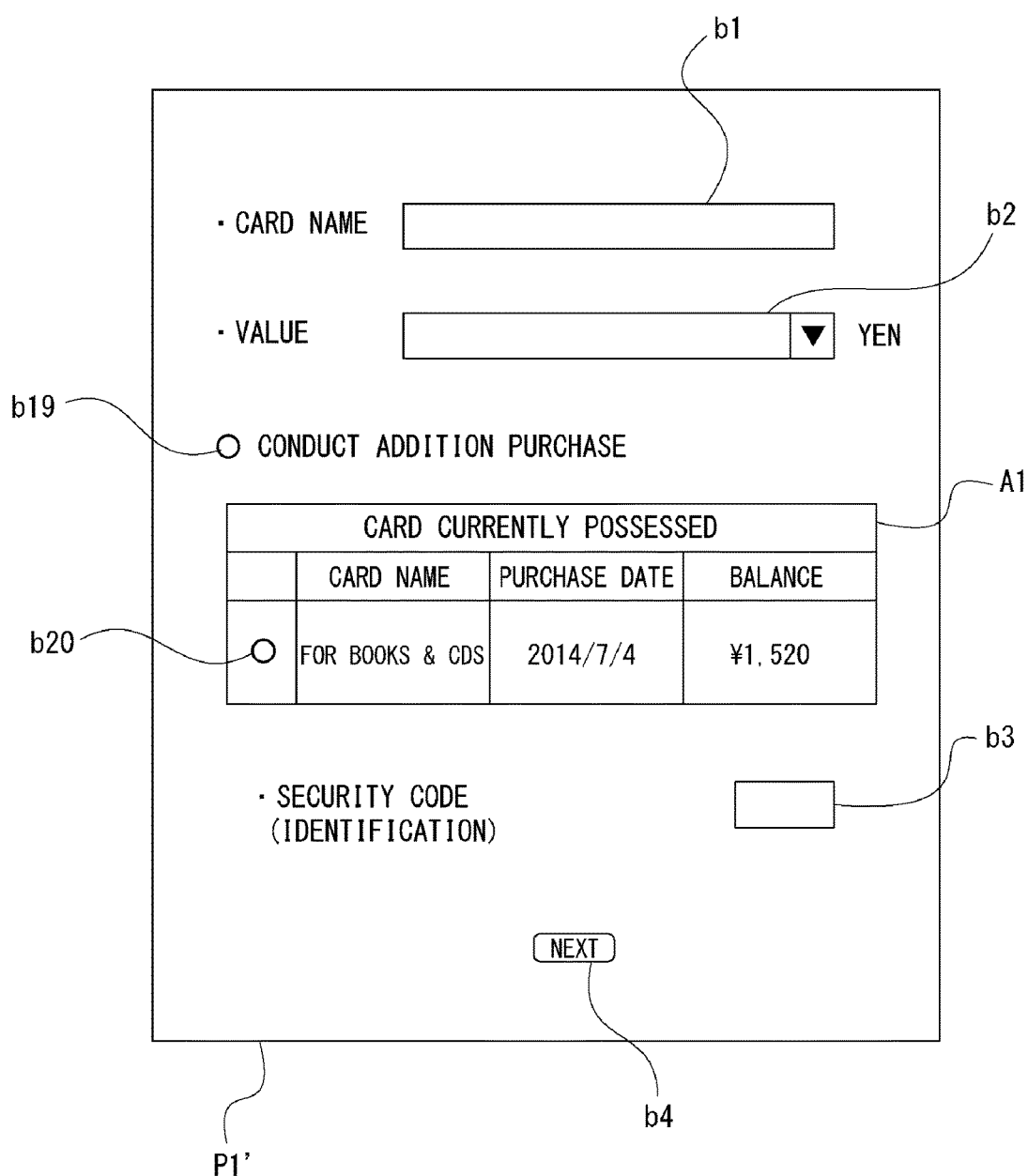
FIG. 15 is a diagram illustrating an example of the virtual prepaid card purchase page to be displayed when a possessed virtual prepaid card exists.

FIG. 15 illustrates an example of a purchase page P1' to be displayed when a user possesses a virtual prepaid card.

Displayed in the purchase page P1' are: the information displayed in the purchase page P1 illustrated in FIG. 7, a purchase selection checkbox b19, a possessed card listing area A1, and a card selection checkbox b20. The purchase selection checkbox b19 is for selecting whether or not to conduct combined purchases. The possessed card listing area A1 displays a list of virtual prepaid cards currently possessed by a user (within a period of validity). The card selection checkbox b20 is provided for each virtual prepaid card displayed in the possessed card listing area A1, for selecting whether or not a respective virtual prepaid card is to be used in combined purchases.

In the possessed card listing area A1, respective information on a card name, a purchase date, and a balance is displayed for each virtual prepaid card.

When a user desires combined purchases, in the purchase page P1', the user inputs corresponding information to each of the card name input box b1, a value input box b2, and a security code input box b3, and also checks the purchase selection checkbox b19 and the card selection checkbox b20 which is displayed corresponding to a virtual prepaid card to be used in combined purchases, among one or more virtual prepaid cards displayed in the possessed card listing area A1, and then clicks the "Next" button b4.

As a response to the above-described clicking of the "Next" button b4, a confirmation page for confirming information inputted to the purchase page P1'. The confirmation page differs depending on whether the purchase selection checkbox b19 and the card selection checkbox b20 are checked or not. When the purchase selection checkbox b19 is not checked, the above-described confirmation page P11 is displayed. On the other hand, when both of the boxes b19 and b20 are checked, a confirmation page, hereinafter referred to as a "confirmation page P11'" is displayed. The confirmation page P11' displays as value information, instead of the value inputted in the purchase page P1', a total sum combining the value and the balance of a virtual prepaid card for which the checkbox b20 is checked. Specifically, in the confirmation page P11', information on a card name inputted in the purchase page P1' and specification information for a virtual prepaid card to be used in combined purchases, in addition to information on the value, are displayed.

In the confirmation page P11', a "Previous" button for returning to the purchase page P1' and a "Purchase" button for making a purchase are displayed. When inputted information is inaccurate, a user can click the "Return" button and correct the inputted information. And by clicking the "Purchase" button, a user can instruct the card company server 7a (the VP card purchase handling processing unit 11) on combined purchases of virtual prepaid cards according to the information inputted to the purchase page P1'. In other words, a user can instruct issue of a virtual prepaid card having a value equal to a total sum obtained by adding a balance of a virtual prepaid card for which the card selection checkbox b20 is checked to the value inputted in the value input box b2.

In addition to a display control process for displaying the purchase page P1' and the confirmation page (P11 or P11') which are described above to a user in the user terminal 4, the VP card purchase handling processing unit 11 performs an identification process with a security code inputted in the purchase page P1' in accordance with the clicking on the above-described "Purchase" button in the confirmation page P11'. When the identification is valid, the VP card purchase handling processing unit 11 performs again an authorization process regarding a credit card used for the purchase of a virtual prepaid card. At the authorization process, the VP card purchase handling processing unit 11 performs a process of determining whether or not a purchase amount of the virtual prepaid card (in this example, equivalent to the value inputted to the value input box b2) does not exceed an available credit.

When the authorization is valid, the VP card purchase handling processing unit 11 performs a control for issuing a virtual prepaid card according to information inputted to the purchase page P1'. Specifically, the VP card purchase handling processing unit 11 generates a card number and a security code for a new virtual prepaid card, and then causes the VP card DB 7d to store respective information on a cardholder, a card name, a value, a purchase date, an expiration date, a balance, and a purchaser user ID, along with the card number and the security code.

As information on a value and a balance, the VP card purchase handling processing unit 11 causes the VP card DB 7d to store a total sum obtained by adding the balance of a virtual prepaid card for which the card selection checkbox b20 is checked to the value inputted in the value input box b2. The balance of a virtual prepaid card for which the card selection checkbox b20 is checked is acquired from the VP card DB 7d, based on the user ID of a user possessing the virtual prepaid card.

The VP card purchase handling processing unit 11 also performs a deletion process of a virtual prepaid card used in combined purchases. That is, the VP card purchase handling processing unit 11 performs a control for deleting as a whole the information of a virtual prepaid card used in combined purchases from the VP card DB 7d.

5. Processing Procedure

Specific processing procedure to execute the functions of the card company server 7a as the above-described embodiment is described with reference to the flowcharts of FIGS. 16 to 22.

The processing described in FIGS. 16 to 22 is performed by the CPU 101 of the card company server 7a according to a program stored in an appropriate storage unit, for example, the ROM 102 and the like.

Figure 16:
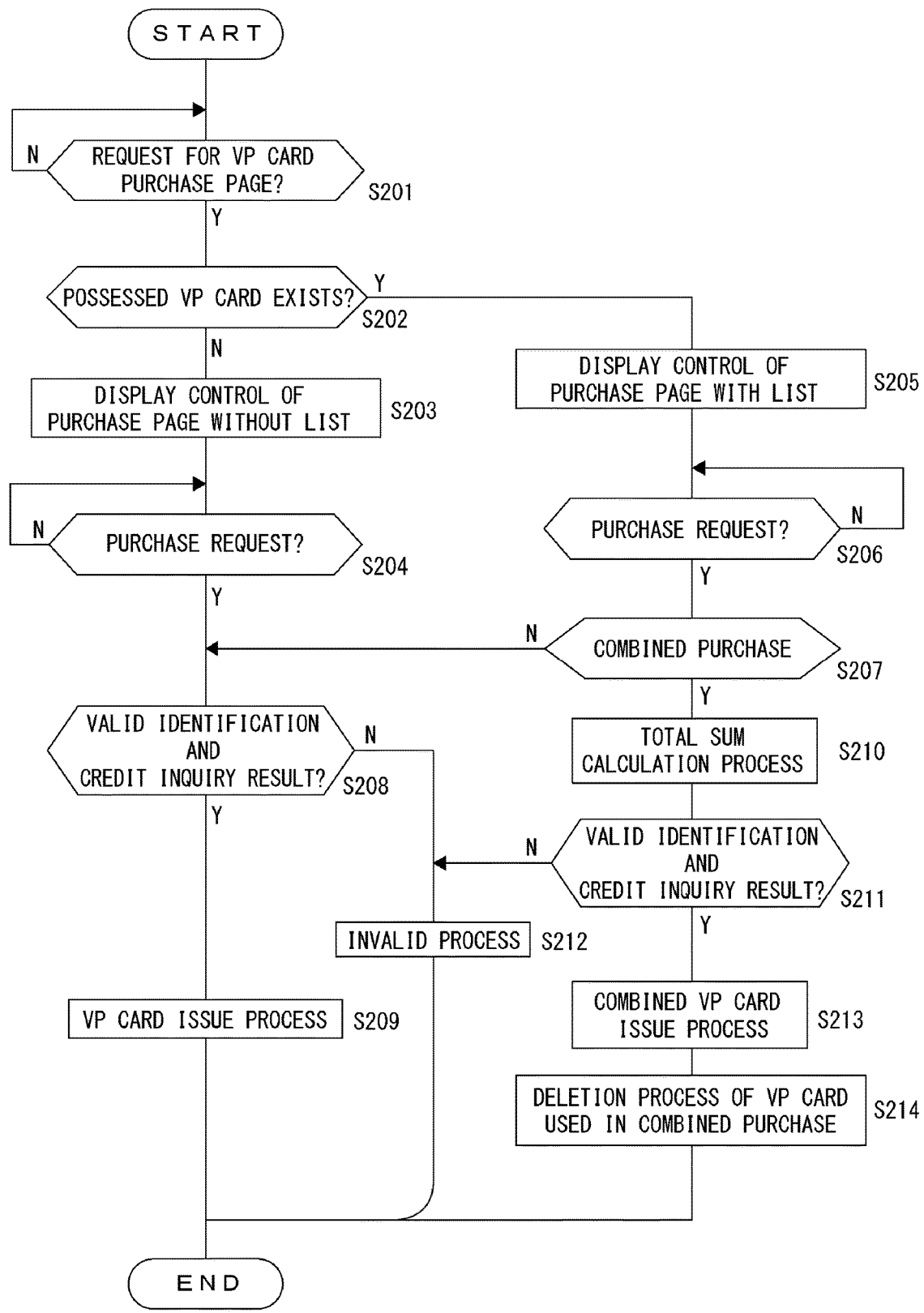
FIG. 16 is a flowchart illustrating processing procedure to execute functions of a VP card purchase handling processing unit.

FIG. 16 illustrates specific processing procedure to execute a function of the VP card purchase handling processing unit 11.

In FIG. 16, the CPU 101 waits for a request for a VP card purchase page transmitted from the user terminal 4 at Step S201, and when receiving a request for a VP card purchase page, determines whether or not a possessed virtual prepaid card exists at Step S202. In other words, the CPU 101 determines whether or not the user of the user terminal 4 transmitting the above request possesses a virtual prepaid card. Specifically, the CPU 101 determines whether or not a virtual prepaid card, such that the user ID of the user is stored as a purchaser user ID in the VP card DB 7d and also the information on a cardholder corresponds to the name information of the purchaser user ID, exists.

When the CPU 101 determines at Step S202 that a possessed virtual prepaid card does not exist, the CPU 101 proceeds to Step S203 and performs a control for displaying the purchase page P1 as described in FIG. 7 in the user terminal 4, as a display control of a purchase page without a list. Subsequently, at Step S204, the CPU 101 waits for a purchase request from the user terminal 4.

Though illustration is omitted, after performing the display control of the purchase page P1, in response to a request transmitted from the user terminal 4 by clicking the "Next" button b4 in the purchase page P1, the CPU 101 performs a display control of the above confirmation page P11, in order to confirm the information inputted in the purchase page P1. As a process at Step S204, the CPU 101 waits for a request transmitted from the user terminal 4 by clicking the "Purchase" button displayed in the confirmation page P11.

When a purchase request is transmitted, the CPU 101 at Step S208 determines whether or not identification and the result of credit inquiry are valid. That is, the CPU 101 performs an identification process with a security code inputted in the purchase page P1, and when the identification is valid, the CPU 101 performs at a credit inquiry process a determination process determining whether or not the value inputted in the value input box b2 does not exceeds an available credit in the C card DB 7b. When either the identification or the result of credit inquiry is invalid, the identification and the result of credit inquiry are determined to be not valid, and the CPU 101 proceeds to Step S212 to perform an Invalid process, and then terminates the processing illustrated in the figure. At the Invalid process, the CPU 101 performs at least a process of displaying invalid information on identification or credit inquiry, whichever is invalid to the user.

Meanwhile, when the identification and the result of credit inquiry are valid, the CPU 101 proceeds to Step S209, performs a VP card issue process, and then terminates the processing illustrated in the figure. At the VP card issue process, the CPU 101 generates a card number and a security code of a new virtual prepaid card, and then causes respective information on a card name and a value, as information inputted to the purchase page 1, and respective information on purchase data (a current year, month and day), an expiration date (in this example, the first anniversary of the current year, and month), a balance (equal to the value), and a purchaser user ID, along with the card number and the security code, to be stored, being associated with one another, in the VP card DB 7d.

Accordingly, the virtual prepaid card with an inputted value can be managed as a newly issued card possessed by a user as a purchaser.

When the CPU 101 determines that a possessed virtual prepaid card exists at the above Step S202, the CPU 101 proceeds to Step S205 and performs a control for displaying the purchase page P1', as described in FIG. 15, in the user terminal 4 as a display control of a purchase page with a list. Subsequently, at next step S206, the CPU 101 waits for a purchase request from the user terminal 4.

Though illustration is omitted, after performing the display control of the purchase page P1', in response to a request transmitted from the user terminal 4 by clicking the "Next" button b4 in the purchase page P1', the CPU 101 displays the confirmation page P11 or the confirmation page P11', depending on whether or not the purchase selection checkbox b19 and the card selection checkbox b20 are checked. The process at Step S206 is a process of waiting for a request transmitted from the user terminal 4 by clicking the "Purchase" button displayed in the confirmation page P11 or P11'.

When receiving a purchase request, the CPU 101 determines whether or not combined purchases are specified at Step S207, depending on whether or not the purchase selection checkbox b19 and the card selection checkbox b20 are checked in the purchase page P1'. When the CPU 101 determines that the purchase selection checkbox b19 and the card selection checkbox b20 are not checked, and thus combined purchases are not specified, the CPU 101 performs processing from Step S208. That is, in this case, processing equivalent to a case where a possessed virtual prepaid card does not exist as described above is performed, and a prepaid card without combined purchases is issued.

On the other hand, when the CPU 101 determines that the purchase selection checkbox b19 and the card selection checkbox b20 are checked and thus combined purchases are specified, the CPU 101 proceeds to Step S210. At Step S210, the CPU 101 performs at a total sum calculation process, a process of calculating a total sum obtained by adding the balance of a virtual prepaid card for which the card selection checkbox b20 is checked to the value inputted in the value input box b2. Then, at Step S211, the CPU 101 determines whether or not identification and authorization are valid, as at above-described Step S208.

In this case, when either the identification or the authorization is invalid, the identification and the authorization are also determined to be not valid, and the CPU 101 performs the Invalid process of Step S212, and then terminates the processing illustrated in the figure.

On the other hand, when the identification and the result of credit inquiry are valid, the CPU 101 proceeds to Step S213 and performs a combined VP card issue process. The combined VP card issue process is identical to the VP card issue process at Step S209, except that not the amount inputted to the value input box b2, but a total sum calculated at Step S 210 is stored in the VP card DB 7*d* as the information on a value and a balance. Thus, an overlapping explanation is avoided.

In response to performing the combined VP card issue process, the CPU 101 at Step S214 performs a deletion process of a virtual prepaid card used in combined purchases, and then terminates the processing illustrated in the figure. As described above, at the deletion process, a process of deleting the information of a virtual prepaid card used in combined purchases as a whole from the VP card DB 7*d* is performed.

Though illustration is omitted, when the identification and the result of credit inquiry are valid at Step S208 or S211 and a virtual prepaid card is issued at Steps S209 and S213, the CPU 101 performs the processes illustrated in FIG. 5 concerning credit card payment for purchase of the virtual prepaid card; specifically, the process of prompt settlement information notification (Step S111), the process of settlement registration (Step S113), the process of usage history update (Step S114), and the process of settlement information notification (Step S115).

Figure 17:
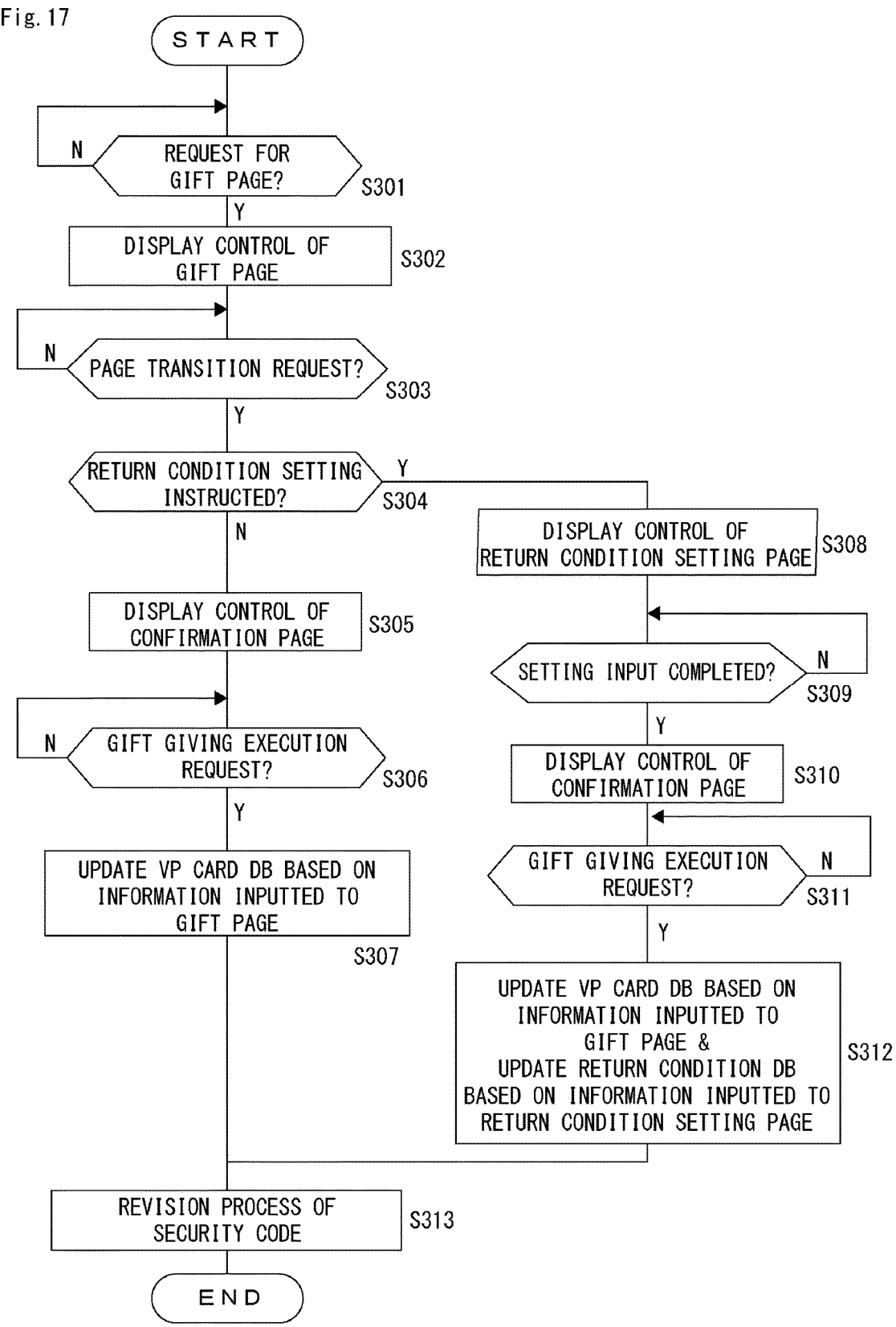
FIG. 17 is a flowchart illustrating processing procedure to execute functions as a VP card gift processing unit and the return condition setting processing unit.

FIG. 17 illustrates processing procedure to execute functions as the VP card gift processing unit 13 and the return condition setting processing unit 14.

In FIG. 17, the CPU 101 first waits at Step S301 for a request for a gift page. Specifically, the CPU 101 waits for a request for the gift-related information setting page P3 (FIG. 10) transmitted from the user terminal 4 by clicking the "Give a Gift" button b6 in the purchased card list page P2 illustrated in FIG. 9 (or in the purchased card list page P2' illustrated in FIG. 13: the same at the following processes)

When receiving the request, the CPU 101 performs, at a display control process of a gift page at Step S302, a control process for displaying in the user terminal 4 the gift-related information page P3 regarding a virtual prepaid card for which the "Give a Gift" button b6 is clicked in the purchased card list page P2.

At next Step S303, the CPU 101 waits for, as a page transition request, a page transition request transmitted from the user terminal 4 by clicking the "Next" button 10 in the gift-related information setting page P3 that is displayed at Step S302.

When receiving the request, the CPU 101 determines whether or not return condition setting is instructed at Step S304. That is, the CPU 101 determines whether or not the request is transmitted by clicking the "Next" button b10 with the return condition checkbox b9 checked in the gift-related information setting page P3 that is displayed at Step S302.

When the CPU 101 determines that return condition setting is not instructed at Step S304, the CPU 101 proceeds to Step S305 and performs a display control process of a confirmation page. That is, the CPU 101 performs a control for displaying, as a confirmation page 13 of the information inputted to the gift-related information setting page P3, a page including the information inputted in the recipient ID input box b7 and the cardholder input box b8, the information telling that a return condition is not set, a "Previous" button, and an "Execute" button. The Previous button is for returning to the gift-related information setting page P3, and the "Execute" button is for instructing execution of gift giving.

After performing the display control process at Step S305, the CPU 101 waits for a gift giving execution request at Step S306. That is, the CPU 101 waits for a request transmitted from the user terminal 4 by clicking the "Execute" button in the confirmation page P13 displayed at Step S305.

When receiving the request from the user terminal 4, the CPU 101 performs at Step S307 a process for updating the VP card DB 7*d* based on the information inputted to the gift page. Specifically, regarding the card number of a virtual prepaid card for which the "Give a Gift" button b6 is clicked in the purchased card list page P2 among one or more card numbers stored in the VP card DB 7*d*, the CPU 101 performs a control process for causing the information on the user ID inputted in the recipient ID input box b7 to be stored anew as the information on the recipient user ID associated to the card number. In addition, the CPU 101 performs a control for causing the name information inputted in the cardholder input box b8 to be stored in the VP card DB 7*d* as the information on a cardholder associated to the card number.

At next Step S313, the CPU 101 performs a revision process of a security code, and then terminates the processing illustrated in the figure. At the revision process of a security code at Step S313, the CPU 101 generates a new security code, and performs a control for causing the generated security code to be stored as the security code associated with a card number of a virtual prepaid card for which the "Give a Gift" button b6 is clicked, among one or more card numbers in the VP card DB 7*d*. In addition, the CPU 101 performs a process of notifying by email the information on the generated security code to the user terminal 4 of a user as a recipient.

Further, when the CPU 101 determines that return condition setting is instructed at Step S304, the CPU 101 proceeds to Step S308 and performs a control process for displaying the return condition setting page P4, as illustrated in FIG. 11, in the user terminal 4. At next Step S309, the CPU 101 waits for completion of return condition setting input. Specifically, the CPU 101 waits for a page request transmitted from the user terminal 4 by clicking the "Complete" button b15 in the return condition setting page P4.

When receiving the request from the user terminal 4 and determining that return condition setting input is completed, the CPU 101 performs a display control process of a confirmation page at Step S310. That is, the CPU 101 performs a control for displaying the confirmation page P14 that displays the "Execute" button for instructing execution of gift giving, along with the information on the recipient user ID and the cardholder inputted in the gift-related information setting page P3 and the information inputted in the return condition setting page P4, as a confirmation page in the user terminal 4.

At next Step S311, the CPU 101 waits for a gift giving execution request. That is, the CPU 101 waits for a request transmitted from the user terminal 4 by clicking the "Execute" button in the confirmation page P 14 that is displayed at Step S310.

When receiving the request from the user terminal 4, the CPU 101 at Step S312 performs processes for updating the VP card DB 7*d* based on the information inputted to the gift page and updating the return condition DB 7*f* based on the information inputted to the return condition setting page P4. Specifically, the CPU 101 performs an identical process with the process at Step S307, as the updating process of the VP card DB 7*d* based on the information inputted to the gift page. At the update process of the return condition DB 7*f* based on the information inputted to the return condition setting page P4, the CPU 101 performs a process of causing the card number of a virtual prepaid card for which the "Give a Gift" button b6 is clicked, and the information on a return execution balance and/or a period of usage which is inputted to return condition setting page p4, to be stored, being associated with one another, in the return condition DB 7f.

After performing the update process at Step S312, the CPU 101 performs the revision process of a security code at Step S313, and then terminates the processing illustrated in the figure.

Concerning the return condition setting, there may be a case where the "Complete" button b15 is clicked without return conditions being inputted in the return condition setting page P4, even though the "Next" button b10 is clicked with the return condition checkbox b9 checked.

According to the processing of FIG. 17, the returning process according to a return condition is not performed in such a case, since information to be stored in the return condition DB 7f does not exist. However, considering a possibility that a return condition is not inputted by an error in a user operation, in this case, for confirmation, another operation for return condition setting may be requested by displaying a page notifying a user that a return condition is not inputted.

Figure 18:
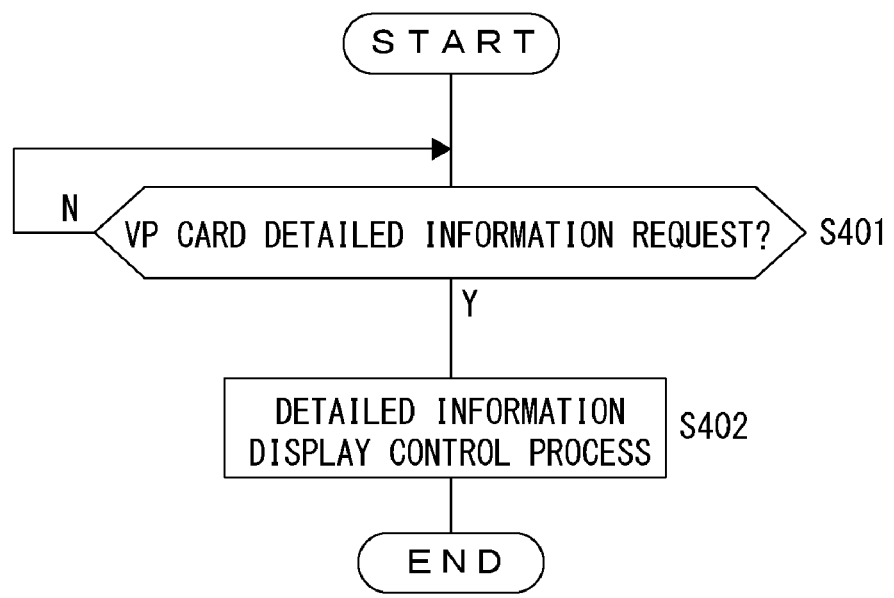
FIG. 18 is a flowchart illustrating processing procedure to execute functions of a VP card information display control processing unit.

FIG. 18 illustrates processing procedure to execute a function of the VP card information display control processing unit 15.

In FIG. 18, the CPU 101 waits for a VP card detailed information request at Step S401. That is, the CPU 101 waits for a page request transmitted from the user terminal 4 by clicking the Detail button b17 in the purchased card list page P2'.

When receiving the page request, the CPU 101 performs a detailed information display control process at Step S402, and then terminates the processing illustrated in the figure. As the detailed information display control process at Step S402, the CPU 101 performs a control process for displaying in the user terminal 4 the detailed card information page P5 (FIG. 14) of a virtual prepaid card for which the Detail button b17 is clicked. At this process, the CPU 101 acquires the respective information on a recipient name, a card name, an expiration date, a value, a balance, a return execution balance, and a usage due data, which is to be displayed in the detailed card information page P5, from the VP card DB 7d, based on the card number of a virtual prepaid card for which the Detail button b17 is clicked. Regarding a recipient name, information on a cardholder in the VP card DB 7d is acquired. When information corresponding to the respective information on a return execution balance or a period of usage does not exist (that is, not set) in the VP card DB 7d, the columns for the information on a return execution balance or a period of usage may be blank.

Regarding the usage history information to be displayed in the detailed card information page P5 (information on a transaction shop, a transaction date, and a transaction amount for each card transaction), the CPU 101 acquires the information from the VP card usage history DB 7e, based on the card number of a virtual prepaid card for which the Detail button b17 is clicked.

In this example, the detailed card information page P5 is displayed on condition that a user has logged in, since, as described above, login is required for a user in order to display the purchased card list page (P2, P2').

In order to display the detailed card information page P5 on condition that a user has logged in, a login request to the user terminal 4 may be made just before display of the detailed card information page P5. In this case, a process of transmitting a login request to the user terminal 4 and a process of determining whether or not login in response to the login request is completed may be posited between Steps S401 and S402 in FIG. 18. Only when login is completed, the display control process at Step S402 is performed.

FIGS. 19 to 22 illustrate processing procedure to execute a function of the return condition handling processing unit 16. First, processing regarding a return execution balance is described in FIG. 19.

Figure 19:
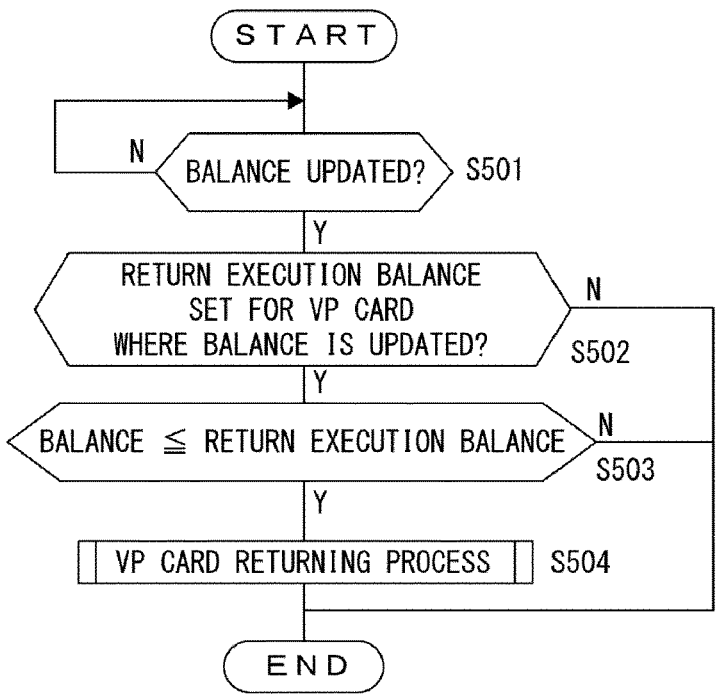
FIG. 19 is a flowchart illustrating processing procedure related to a return execution balance, among processes to execute the functions of the return condition handling processing unit.

In FIG. 19, the CPU 101 performs, at a balance update waiting process at Step S501, a waiting process until the information on a balance is updated in the VP card DB 7d by the virtual prepaid card transaction.

When the balance is updated, CPU 101 at Step S502 determines whether or not a return execution balance is set for the virtual prepaid card where balance is updated, based on the return condition DB 7f. If a return execution balance is not set for the virtual prepaid card, the CPU 101 terminates the processing illustrated in the figure.

If a return execution balance is set for the virtual prepaid card, the CPU 101 proceeds to Step S503, and determines whether or not the balance of the virtual prepaid card does not exceed the return execution balance. At this process, the information on a return execution balance is acquired for use from the return condition DB 7f, based on the card number of the virtual prepaid card.

When the balance does not exceed the return execution balance, the CPU 101 proceeds to Step S505 and performs a VP card returning process, and then terminates the processing illustrated in the figure.

Specific processing of the VP card return process will be described later.

Figure 20:
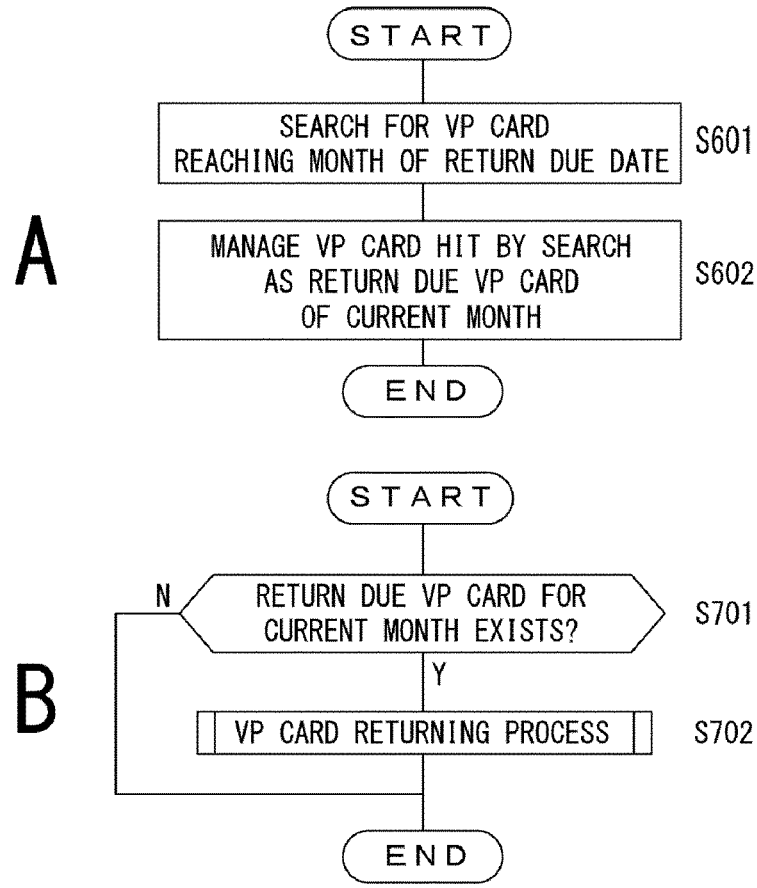
FIG. 20 is a flowchart illustrating processing procedure related to a return due date among processes to execute the functions of the return condition handling processing unit.

FIG. 20 illustrates processing regarding a return due date. In this example, A returning process of virtual prepaid cards based on a return due date is performed by managing a card reaching the return due date on a monthly basis. The CPU 101 performs processing illustrated in FIGS. 20A and 20B on a predetermined day, for example, the last day of a month and the like, and executes the returning of virtual prepaid cards based on a return due date.

First, at Step S601 in FIG. 20A, the CPU 101 searches for virtual prepaid cards reaching the month of a return due date, based on the return condition DB 7f. That is, the CPU 101 searches for virtual prepaid cards with a set return due date is a current month of the search.

At next Step S602, the CPU 101 performs a process for managing virtual prepaid cards hit by the search as a return due VP card of a current month, and then terminates the processing illustrated in FIG. 20A. At the process at Step S602, the CPU 101 performs a process of making a list of card numbers of virtual prepaid cards hit by the search as card numbers of return due VP cards of a current month, and of causing the list to be stored in predetermined memory.

The processing illustrated in FIG. 20B is performed after performing the processing in FIG. 20A.

In FIG. 20B, the CPU 101 at Step S701 determines whether or not return due VP cards of a current month exist, based on the list of card numbers, which have been caused to be stored in the predetermined memory.

When return due VP cards of a current month do not exist, the CPU 101 terminates the processing described in FIG. 20B. Meanwhile, when return due VP cards of a current month exist, the CPU 101 performs the VP card returning process (described later) at Step S702 and terminates the processing illustrated in FIG. 20B.

Figure 21:
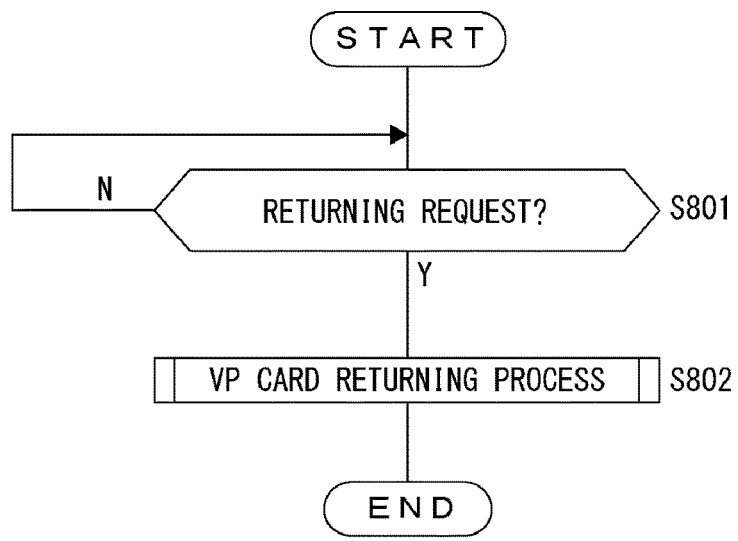
FIG. 21 is a flowchart illustrating processing procedure related to returning of a virtual prepaid card in response to a user operation among processes to execute the functions of the return condition handling processing unit.

FIG. 21 is processing regarding returning a virtual prepaid card in response to a user operation. At Step S801, the CPU 101 waits for a returning request. Specifically, in this example, the CPU 101 waits for a request transmitted from the user terminal 4 by clicking the "Return" button b18 in the purchased card list page P2' (FIG. 13).

When not receiving a returning request, the CPU 101 terminates the processing illustrated in FIG. 21. When receiving a returning request, the CPU 101 performs the VP card returning process (described later) at Step S802, and then terminates the processing illustrated in FIG. 21.

Figure 22:
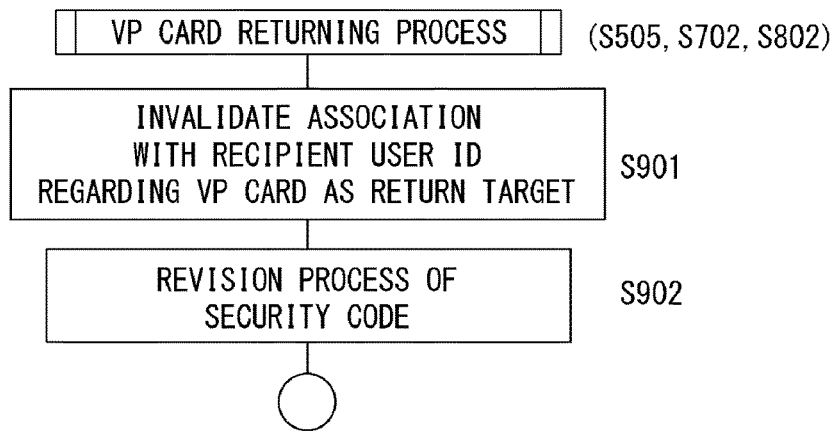
FIG. 22 is a flowchart illustrating a VP card returning process.

FIG. 22 illustrates the VP card returning process.

In FIG. 22, the CPU 101 at Step S901 performs a process of invalidating an association with a recipient user ID regarding a virtual prepaid card as a return target. That is, the CPU 101 performs a process of causing the information on the recipient user ID associated with the card number of the corresponding virtual prepaid card in the VP card DB 7d to be deleted.

Subsequently, the CPU 101 at Step S902 performs a revision process of a security code. That is, the CPU 101 generates a new security code and performs a process of causing the information on the generated security code to be stored in place of the information on the security code associated with the card number stored in the VP card DB 7d. In addition, in order to notify a purchaser of the revised security code, the CPU 101 performs a process of notifying by email the information on the generated security code to the user terminal 4 of a user as a purchaser of the virtual prepaid card. The CPU 101 then terminates the VP card returning process.

In order to prevent further use of a returned virtual prepaid card by a gift recipient user, the revision of a security code is described above as an exemplary measure. However, instead of, or in addition to the above-described measure, a card number may be revised.

6. Variations of Embodiment

As an exemplary measure of purchasing a new virtual prepaid card utilizing the balance of a possessed virtual prepaid card, a measure of combined purchases is described above. Instead, a measure of discount purchase may be adopted, in which a purchase price for a new virtual prepaid card is a price discounted by the balance of a possessed virtual prepaid card. Specifically, when newly purchasing a virtual prepaid card with a value of 10,000 yen, under a condition that a possessed virtual card with a value of 300 yen is specified, a purchase price is discounted to be 9,700 yen.

Figure 23:
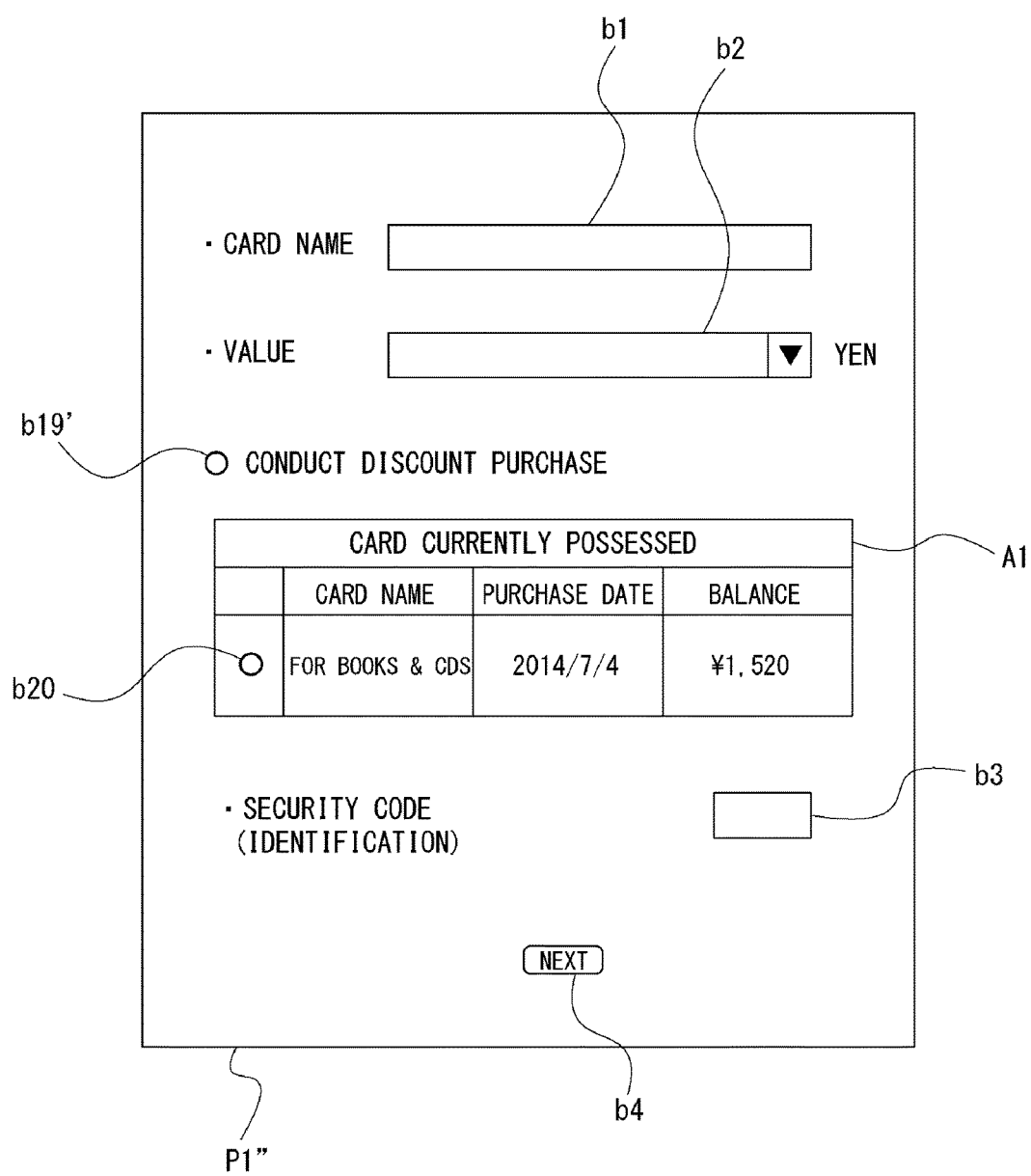
FIG. 23 is a diagram illustrating an example of a purchase page for conducting discount purchase.

When enabling such discount purchase, a purchase page P1" as illustrated in FIG. 23 is displayed as a purchase page with a possessed virtual prepaid card. In the purchase page P1", the purchase selection checkbox b19 in the purchase page P1' illustrated in FIG. 15 is modified to a purchase selection checkbox b19' for selecting whether or not to conduct discount purchase.

In this case, in response to the clicking of the "Next" button b4 under a state where the purchase selection checkbox b19' is checked and also a card selection checkbox b20 corresponding to one of one or more possessed cards is checked in the purchase page P1‴, the CPU 101 performs a display control of a confirmation page P11‴. In the confirmation page P11‴, a "Purchase" button is displayed along with the information inputted to the purchase page P1‴. When the "Purchase" button is clicked, the CPU 101 performs a control for executing discount purchase utilizing the balance of a selected possessed virtual prepaid card.

Specifically, in response to a request (a purchase execution request) transmitted from the user terminal 4 by clicking the "Purchase" button, regarding a charge for a purchase price of a new virtual prepaid card, the CPU 101 performs a control for causing the following price to be charged: the price being obtained by subtracting the balance of a virtual prepaid card for which the card selection box b20 is checked from a price corresponding to the value inputted to the purchase page P1".

More specifically, the CPU 101 in this case determines whether or not to conduct discount purchase based on whether or not the purchase selection checkbox b19' is checked in the purchase page P1" at Step S207 in FIG. 16.

At Step S210, at a discount price calculation process, the CPU 101 performs a process of calculating a price by subtracting the balance of a virtual credit card for which the card selection checkbox b20 is checked from the value inputted in the value input box b2 in the purchase page P1". Further, at Step S211, at an authorization process, the CPU 101 determines whether or not the calculated discount price does not exceed an available credit.

At Step S213, a process identical to the process at Step S209 is performed. The process is for making the value (and balance) of a virtual prepaid card equal to the value inputted in the value input box b20 b2 in the case of discount purchase.

In this case, regarding credit card transaction for a virtual prepaid card purchase, the CPU 101 performs processes described in FIG. 5, that is, a process of prompt settlement information notification (Step S111), a process of settlement registration (Step S113), a process of usage history update (Step S114), and a process of settlement information notification (Step S115), with the discount price calculated at Step S210 as a transaction amount.

Next, a variation regarding a usage restriction is described.

As a condition that can be set regarding a virtual prepaid card given by a user as a purchaser (a first user) to a second user, conditions solely regarding returning of the card are described above. However, in a case of, for example, a parent being the first user and his/her child being the second user, setting of a condition (a restriction) regarding usage, for example, a restriction on a transaction shop, may be enabled regarding a gift-given virtual prepaid card.

Figure 24:
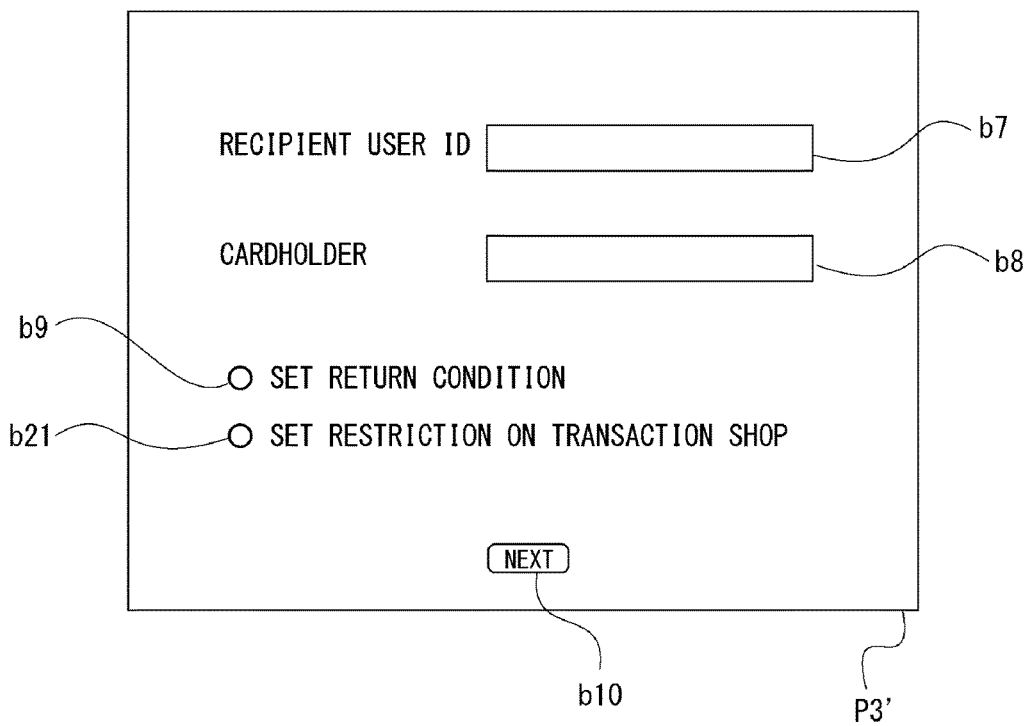
FIG. 24 is a diagram illustrating an example of the gift-related information setting page to be displayed when setting a restriction on a transaction shop.

For example, when setting a restriction on a transaction shop, the CPU 101 displays a gift-related information setting page P3' including a restriction setting selection checkbox b21' to select whether or not to set a restriction on a transaction shop illustrated in FIG. 24, instead of the gift-related information setting page P3 illustrated in FIG. 10.

Figure 25:
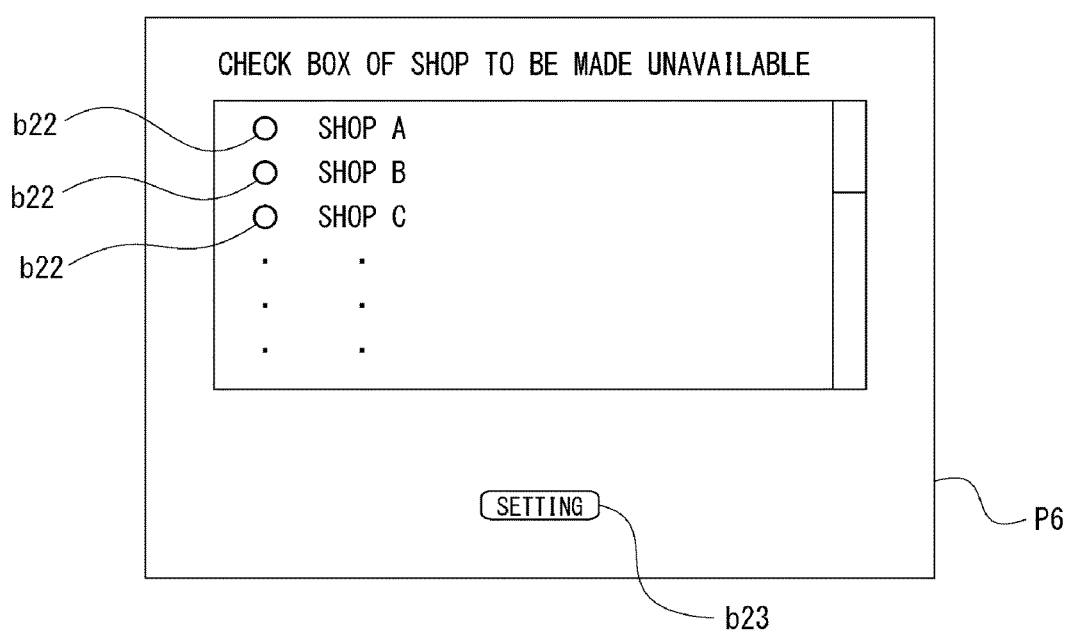
FIG. 25 is a diagram illustrating an example of a shop restriction setting page.

In this case, in response to the clicking of the "Next" button b10 with the restriction setting selection checkbox b21' checked, the CPU 101 performs a control for displaying a shop restriction setting page P6 as illustrated in FIG. 25 in the user terminal 4. As illustrated in the figure, in the shop restriction setting page P6, information on a shop registered in the EC site (shopping site) provided by the shopping server 3a, at least information on a shop name, is displayed, and a shop selection checkbox b22 is provided for each shop information. The shop selection checkbox b22 is for selecting whether or not to set the shop as an unavailable shop. A display of shop information is not limited to a list display, only information of shops corresponding to a keyword or genre specified by a user may be selectively displayed.

In the shop restriction setting page P6, a "Setting" button b23 for instructing the setting of an unavailable shop is provided. When the "Setting" button b23 is clicked under a condition that an unavailable shop is selected by the shop selection checkbox b22, the CPU 101 performs a setting process of usage restriction information.

FIG. 26 illustrates an example of usage restriction information.

The usage restriction information in this case is the information associating the information of a recipient user ID with the information on a restricted shop (an unavailable shop in this example), such as a shop ID, for each card number of the virtual prepaid card specified as a target of usage restriction information setting. Though illustration is omitted, such usage restriction information is stored in a usage restriction information DB that is made to be communicable via, for example, the network 2.

At the setting process of usage restriction information, the CPU 101 performs a process of acquiring information on the card number of a virtual prepaid card specified as a target for usage restriction setting (specified as a gift target) from the VP card DB 7d. Then, the CPU 101 performs a process of causing the information on the acquired card number, the information on a user ID inputted in the recipient ID input box b7 in the gift-related information setting page P3', and the information (a shop ID) on a shop for which the shop selection checkbox b22 is checked to be stored, being associated with one another, in the usage restriction information DB.

By setting the usage restriction information illustrated in FIG. 26, for example, the shopping server 3a can restrict use of the virtual prepaid card at a restricted shop in the EC site based on the usage restriction information. In such a case, each time an order is placed with a virtual card specified as a payment method, the shopping server 3a determines whether or not a virtual prepaid card as an unavailable target is used or not, (that is, whether or not a virtual prepaid card with preliminarily set usage restriction information is used at an unavailable shop), based on the respective information on the card number of the virtual prepaid card, the shop at which the order is placed, and the usage restriction information. When determining that an unavailable target is used, the shopping server 3a does not display an order placement page, but instead displays, for example, an error page informing that the virtual prepaid card is unavailable at the shop. As a result, a state that a user as a recipient cannot use a gift-given virtual prepaid card at an unavailable shop is ensured.

A measure of setting a usage restriction is not limited to a restriction based on a unit of an unavailable shop as described above (a restriction that makes all the products dealt in a target shop unavailable for purchase), but a variety of measures may be conceivable. For example, a restriction that makes only a predetermined product in a target shop unavailable for purchase, and a restriction on the order quantity of a product may be conceivable. Further, a usage restriction may be based on a unit of a product or a product genre.

Regarding the restriction based on a unit of a shop, not only a registered shop in the EC site provided by the shopping server 3a is targeted as described above, but also a member shop belonging to a card brand affiliated by the card company operating the card company server 7a may also be targeted. In this case, a card usage restriction process based on the usage restriction information can be performed by the card company server 7a.

7. Summary of Embodiment

As described above, an information processing device (the card company server 7a) according to the present embodiment includes a card issuing control processing unit (the VP card purchase handling processing unit 11), a gift processing unit (the VP card gift processing unit 13) and a return condition setting processing unit (the return condition setting processing unit 14). The card issuing control processing unit performs a control for issuing a virtual prepaid card such that information on a card number is associated with information on at least a user ID, a value, and an expiration date. The gift processing unit performs a control for, regarding a virtual prepaid card specified as a gift target by a first user, newly associating between the virtual prepaid card and a user ID of a second user other than the first user in response to an operation. The return condition setting processing unit sets a return condition regarding the virtual prepaid card specified as a gift target in response to an operation.

In addition, the information processing device according to the present embodiment further includes a display control processing unit (the VP card information display control processing unit 15) for displaying information on usage status of a gift-given virtual prepaid card given to the second user by the gift processing unit, on condition that login with a user ID of the first user is completed.

Further, the information processing device according to the present embodiment also includes a return condition handling processing unit (the return condition handling processing unit 16) for performing a process of, along with determining whether or not the return condition is fulfilled, at a returning process of a gift-given virtual prepaid card given to the first user upon fulfillment of the return condition, controlling for at least invalidating the association between the virtual prepaid card and a user ID of the second user.

Accordingly, regarding a gift giving function of giving a virtual prepaid card possessed by a first user to a second user, new functions are added; specifically, a function of setting a return condition for a virtual prepaid card as a gift target, and a function of automatically returning the virtual prepaid card to the first user when the return condition is fulfilled. Further, it is enabled that a first user can check the usage status of a gift-given virtual prepaid card, on a screen logged in with a user ID of himself/herself.

Therefore, a management function regarding a gift-given virtual prepaid card given by a first user to a second user can be enhanced.

For example, when the return condition setting function and the automatic returning function in accordance with the return condition are appropriately utilized, a situation where a card turns invalid at a recipient with some balance remaining can be avoided. Thus, a waste of value may be prevented.

Further, when a checking function of usage status by a first user is appropriately utilized, the first user can get an opportunity to determine whether or not returning is necessary.

In the information processing device according to this embodiment, the return condition handling processing unit performs the returning process in response to an operation, even when the return condition is not fulfilled.

Therefore, forced returning of a gift-given virtual prepaid card by an operation is enabled. Accordingly, the gift function has an appeal for a user who desires a function of the forced returning of a gift-given virtual prepaid card without fulfillment of a return condition, thus use of the gift giving function can be expanded.

In addition, in the information processing device according to this embodiment, the card issuing control processing unit performs a control for issuing a virtual prepaid card with a value obtained by adding the balance of a virtual prepaid card possessed by a user to a specified value.

Accordingly, purchase of a new virtual prepaid card to which a balance of a returned virtual prepaid card is added, is enabled.

Therefore, a product and the like with a price higher than the balance of a returned prepaid card can be purchased. Since a case where the balance of the returned virtual prepaid card is too low to utilize can be handled, a waste of a balance can be prevented more assuredly.

Further, the information processing device according to this embodiment includes a charge control processing unit that performs a control for, regarding a charge for a purchase price of a virtual prepaid card with a specified value issued by the control of the card issuing control processing unit, charging the user a price obtained by subtracting the balance of a virtual prepaid card possessed by a user from a price corresponding to the specified value.

Accordingly, discount purchase of a new virtual prepaid card with the balance of a returned virtual prepaid card is enabled.

Therefore, a product and the like with a price higher than the balance of a returned prepaid card can be purchased. Since a case where the balance of the returned virtual prepaid card is too low to utilize can be handled, a waste of a balance is prevented more assuredly.

Further, when discount purchase is appropriately utilized, a virtual prepaid card with a fixed value can be purchased, regardless of the amount of a balance of the returned virtual prepaid card. In a case where a virtual prepaid card with a fixed value is given routinely, for example, as a monthly allowance, it is preferable that the value of a virtual prepaid card is fixed. In this respect, discount purchase is useful.

Further, in the information processing device according to this embodiment, the return condition handling processing unit performs, at the returning process, a control process for revising a security code or a card number of a virtual prepaid card as a return target, along with invalidation of the association with a user ID of a second user.

Accordingly, prevention of further use of a returned prepaid card by a second user is enabled.

Thus, returning is rendered more effective.

Further, the information processing device according to this embodiment includes a usage restriction setting processing unit for, regarding the virtual prepaid card specified as a gift target, setting usage restriction information in response to an operation.

Accordingly, a certain degree of restriction on use of a gift-given virtual prepaid card is enabled.

For example, in a case where a purchaser of a virtual prepaid card is a parent and a gift recipient is his/her child, as described above, the purchaser may desire to restrict a shop at which the gift-given virtual prepaid card can be used. With the above described configuration, the setting of usage restriction information corresponding to an operation, such as the restriction on an available shop is enabled, and thus the use of a gift-given virtual prepaid card can be restricted to a certain degree.

Therefore, the gift function has an appeal to a user who desires a usage restriction function regarding the use of a gift-given virtual prepaid card, thus use of the gift giving function can be expanded.

8. Program and Storage Medium

The card company server 7a as an information processing device of the present invention according to this embodiment is described above. A program according to the present embodiment is a program causing an information processing device (such as a CPU) to perform the processing of the card company server 7a.

A program according to the present embodiment causes an information processing device to execute a card issuing control processing function, a gift processing function, a return condition setting processing function, a display control processing function, and a return condition handling processing function. The card issuing control processing function of performing a control for issuing a virtual prepaid card such that information on a card number is associated with information on at least a user ID, a value, and an expiration date. The gift processing function of performing a control for, regarding a virtual prepaid card specified as a gift target by a first user, newly associating between the virtual prepaid card and a user ID of a second user other than the first user in response to an operation. The return condition setting processing function of setting a return condition regarding the virtual prepaid card specified as a gift target in response to an operation. The display control processing function of performing a control for displaying information on usage status of a gift-given virtual prepaid card given to the second user by the gift processing function, on condition that login with a user ID of the first user is completed. The return condition handling processing function of performing a process of, along with determining whether or not the return condition is fulfilled, at a returning process of the gift-given virtual prepaid card given to the first user upon fulfillment of the return condition, performing a control for at least invalidating the association between the virtual prepaid card and a user ID of the second user.

That is, the program corresponds to a program causing the information processing device to execute the processing illustrated in FIGS. 16 to 22 and similar figures.

According to the program, the information processing device as the card company server 7a described above can be executed.

The program may be stored in advance in an HDD as a storage medium included in a device such as a computer device, or may be stored in advance in an ROM or the like included in a microcomputer having a CPU. Alternatively, the program may be stored temporally or permanently in a removable storage medium, such as semiconductor memory, a memory card, an optical disk, a magneto-optical disk, and a magnetic disk.

The removable storage medium may be provided as so-called package software. The program may be installed to a device such as a personal computer from the removable storage medium, or may be downloaded from a download site through a network, such as a LAN and the Internet.

9. Other Variations

The present invention is not limited to the above embodiment, and diverse variations may be possible.

For example, a return condition that has been set may be canceled. A return condition can be canceled by causing information on a card number corresponding to a virtual prepaid card and information associated with the card number (the information on a return execution balance and/or a period of usage) in the return condition DB 7f to be deleted.

Furthermore, in the above description, the value of a virtual prepaid card is equal to a purchase price of the virtual prepaid card. However, a value may be a sum of a purchase price and a premium. For example, when a purchase price is 10,000 yen and a premium is set as 500 yen, the value is 10,500 yen.

Further, a return condition is not limited to what is described above.

For example, a return condition may be set in more detail as follows: a card is returned when a balance stays below a predetermined amount for a predetermined period, when a card is not used for a predetermined period after given as a gift, or when a predetermined number of purchases is made.

Alternatively, a return condition may be set in different aspects from a period or a balance. For example, a return condition stipulating that a card is returned when a specific product or a product of a specific genre is purchased may be set.

REFERENCE SIGNS LIST

1 Network system, 2 Network, 3 Shopping site operation system, 3a Shopping server, 3b Product DB (database), 3c User DB, 4 User terminal, 5 and 6 Shop terminal, 7 Card company system, 7a Card company server, 7d VP card (virtual prepaid card) DB, 7e VP card usage history DB, 7f Return condition DB, 10 C card transaction request handling processing unit, 11 VP card purchase handling processing unit, 12 VP card transaction request handling processing unit, 13 VP card gift processing unit, 14 Return condition setting processing unit, 15 VP card information display control processing unit, 16 Return condition handling processing unit.

What is claimed is:

1. An information processing device comprising:
   at least one memory operable to store program code; and
   at least one processor operable to read the program code and operate as instructed by the program code, the program code including:
   card issuing control code configured to cause the at least one processor to control issuing a virtual prepaid card for respective users such that information on a card number is associated with information on at least a user ID, a value, and an expiration date;
   gift processing code configured to cause the at least one processor to perform control for, regarding a virtual prepaid card specified as a gift target in response to an operation of a specific user, newly forming an association between the specific user and a user other than the specific user by identifying the other user for the information on a card number, the virtual prepaid card as the gift target being specified from a virtual prepaid card issued for the specific user;
   return condition setting code configured to cause the at least one processor to set a return condition regarding the virtual prepaid card given to the other user by forming the association between the users, content of the return condition being determined in response to the operation of the specific user;
   display control code configured to cause the at least one processor to control displaying information on usage status of a gift-given virtual prepaid card given to the other user, on a condition that a login with a user ID of the specific user is completed; and
   return condition handling code configured to cause the at least one processor to determine whether the return condition is fulfilled, and upon determining that the return condition is fulfilled, automatically perform a returning process of invalidating the association between the specific user and the other user and return a remaining balance of the gift-given virtual prepaid card to the specific user,
   wherein return condition handling code is further configured to cause the at least one processor to perform the returning process in response to the operation of the specific user, even when the return condition is not fulfilled.

2. The information processing device according to claim 1, wherein
   return condition setting code is further configured to cause the at least one processor to set a condition regarding a balance of the virtual prepaid card as the return condition.

3. The information processing device according to claim 1, wherein
   card issuing control code is further configured to cause the at least one processor to perform a control for issuing a virtual prepaid card with a value obtained by adding a balance of a virtual prepaid card possessed by the other user to a specified value.

4. The information processing device according to claim 1, further comprising:
   charge control code configured to cause the at least one processor to perform a control for, regarding a charge for a purchase price of a virtual prepaid card with a specified value, charging the other user a price obtained by subtracting the balance of a virtual prepaid card possessed by the user from a price corresponding to the specified value.

5. The information processing device according to claim 1, wherein
   return condition handling code is further configured to cause the at least one processor to perform, at the returning process, a control process for revising a security code or a card number of a virtual prepaid card as a return target, along with invalidation of the association.

6. The information processing device according to claim 1, further comprising:
   usage restriction setting code configured to cause the at least one processor to set regarding the virtual prepaid card specified as the gift target, usage restriction information in response to the operation by the specific user.

7. The information processing device according to claim 6, wherein usage restriction setting code is further configured to cause the at least one processor to set usage restriction information based on a transaction shop.

8. The information processing device according to claim 6, wherein usage restriction setting code is further configured to cause the at least one processor to set usage restriction information based on a specific product.

9. The information processing device according to claim 6, wherein usage restriction setting code is further configured to cause the at least one processor to set usage restriction information based on a specific genre.

10. The information processing device according to claim 1, wherein display control code is further configured to cause the at least one processor to display a list of at least one transaction shop to be made unavailable as part of the return condition.

11. The information processing device according to claim 10, wherein the list of at least one transaction shop to be made unavailable is generated selectively by the specific user based on keywords or genre specified by the specific user.

12. An information processing method, wherein the method comprises:

performing a control for issuing a virtual prepaid card for respective users such that information on a card number is associated with information on at least a user ID, a value, and an expiration date;

performing control for, regarding a virtual prepaid card specified as a gift target in response to an operation of a specific user, newly forming an association between the specific user and a user other than the specific user by identifying the other user for the information on a card number, the virtual prepaid card as the gift target being specified from a virtual prepaid card issued for the specific user;

setting a return condition regarding the virtual prepaid card given to the other user by forming the association between the users, content of the return condition being determined in response to the operation of the specific user;

performing a control for displaying information on usage status of a gift-given virtual prepaid card given to the other user, on a condition that a login with a user ID of the specific user is completed; and determining whether the return condition is fulfilled, and upon determining that the return condition is fulfilled, automatically performing a returning process of invalidating the association between the specific user and the other user and returning a remaining balance of the gift-given virtual prepaid card to the specific user, wherein the returning process further comprises performing the returning process in response to the operation of the specific user, even when the return condition is not fulfilled.

13. A non-transitory computer readable storage medium storing a program that causes an information processing device to:

perform a control for issuing a virtual prepaid card for respective users such that information on a card number is associated with information on at least a user ID, a value, and an expiration date;

perform control for, regarding a virtual prepaid card specified as a gift target in response to an operation of a specific user, newly forming an association between the specific user and a user other than the specific user by identifying the other user for the information on a card number, the virtual prepaid card as the gill target being specified from a virtual prepaid card issued for the specific user;

set a return condition regarding the virtual prepaid card given to the other user by forming the association between the users, content of the return condition being determined in response to the operation of the specific user;

perform a control for displaying information on usage status of a gift-given virtual prepaid card given to the other user, on a condition that a login with a user ID of the specific user is completed; and determine whether the return condition is fulfilled, and upon determining that the return condition is fulfilled, automatically performing a returning process of invalidating the association between the specific user and the other user and return a remaining balance of the gift-given virtual prepaid card to the specific user, wherein the returning process further comprises performing the returning process in response to the operation of the specific user, even when the return condition is not fulfilled.

* * * * *